(12) United States Patent
Kubo et al.

(10) Patent No.: US 7,294,122 B2
(45) Date of Patent: Nov. 13, 2007

(54) TRANSFER NEEDLE

(75) Inventors: Tomohiko Kubo, Osaka (JP); Shuji Hasegawa, Osaka (JP); Yoshiyuki Sunaga, Kiryu (JP); Takao Kinoshita, Kiryu (JP)

(73) Assignee: NIPRO Corporation, Osaka (JP)

( * ) Notice: Subject to any disclaimer, the term of this patent is extended or adjusted under 35 U.S.C. 154(b) by 0 days.

(21) Appl. No.: 10/892,219

(22) Filed: Jul. 16, 2004

(65) Prior Publication Data

US 2005/0033260 A1   Feb. 10, 2005

(30) Foreign Application Priority Data

Jul. 17, 2003   (JP) .............................. 2003-275735

(51) Int. Cl.
A61B 19/00   (2006.01)
A61M 39/20   (2006.01)

(52) U.S. Cl. ..................... 604/413; 604/410; 604/412

(58) Field of Classification Search ................ 604/413, 604/411, 412, 410
See application file for complete search history.

(56) References Cited

U.S. PATENT DOCUMENTS

| | | | | |
|---|---|---|---|---|
| 62,333 A * | 2/1867 | Holl | ............................ | 215/308 |
| 2,634,726 A * | 4/1953 | Hanson | ........................ | 604/274 |
| 2,712,822 A * | 7/1955 | Gewecke | ..................... | 604/412 |
| 3,788,369 A * | 1/1974 | Killinger | .................... | 141/114 |
| 3,885,607 A * | 5/1975 | Peltier | ......................... | 141/329 |
| 3,938,520 A * | 2/1976 | Scislowicz et al. | .......... | 604/405 |
| 5,454,805 A * | 10/1995 | Brony | ......................... | 604/406 |
| 5,484,070 A * | 1/1996 | Graham | ....................... | 215/223 |
| 5,593,028 A * | 1/1997 | Haber et al. | ................. | 206/221 |
| 5,636,660 A * | 6/1997 | Pfleiderer et al. | ............ | 137/550 |
| 5,669,891 A * | 9/1997 | Vaillancourt | ................. | 604/537 |
| 5,865,793 A * | 2/1999 | Lo et al. | ...................... | 604/500 |
| 6,139,534 A * | 10/2000 | Niedospial et al. | .......... | 604/411 |
| 6,145,688 A * | 11/2000 | Smith | ....................... | 220/259.3 |
| 6,189,580 B1 * | 2/2001 | Thibault et al. | ............... | 141/25 |
| 6,251,091 B1 * | 6/2001 | Weston | ......................... | 604/72 |
| 6,378,576 B2 * | 4/2002 | Thibault et al. | ............. | 141/329 |
| 6,409,708 B1 * | 6/2002 | Wessman | ..................... | 604/284 |
| 6,681,946 B1 * | 1/2004 | Jansen et al. | ................ | 215/249 |
| 6,695,829 B2 * | 2/2004 | Hellstrom et al. | ........... | 604/415 |

(Continued)

FOREIGN PATENT DOCUMENTS

EP   0 521 460 A1   1/1993

(Continued)

*Primary Examiner*—Tatyana Zalukaeva
*Assistant Examiner*—Paula L. Craig
(74) *Attorney, Agent, or Firm*—Kubovcik & Kubovcik

(57) ABSTRACT

A transfer needle comprises: a liquid-specific member; and a medicament-specific member to be separably connected or joined to the liquid-specific member in a liquid-tight state. The liquid-specific member comprises: a liquid-specific hollow needle projecting toward the opposite side from the medicament-specific member. The medicament-specific member comprises: a medicament-specific hollow needle projecting toward the opposite side from the liquid-specific member and communicating with the liquid-specific hollow needle. A female luer is provided on at least one of the liquid-specific member and the medicament-specific member at a position opposing to the other. The female luer communicates with the one hollow needle and is separably connected with an injection needle connecting portion of a syringe in a liquid-tight state.

4 Claims, 25 Drawing Sheets

U.S. PATENT DOCUMENTS

| | | | |
|---|---|---|---|
| 6,948,522 B2* | 9/2005 | Newbrough et al. | 137/550 |
| 2002/0087141 A1* | 7/2002 | Zinger et al. | 604/414 |
| 2003/0070726 A1* | 4/2003 | Andreasson et al. | 141/329 |
| 2003/0109846 A1* | 6/2003 | Zinger et al. | 604/410 |
| 2004/0220532 A1* | 11/2004 | Caizza | 604/264 |
| 2004/0225274 A1 | 11/2004 | Jansen et al. | 604/411 |

FOREIGN PATENT DOCUMENTS

| | | |
|---|---|---|
| EP | 0 679 380 A1 | 11/1995 |
| JP | 49-47507 Y | 12/1974 |
| JP | 54-16152 B2 | 6/1979 |
| JP | 54-31397 U | 8/1979 |
| JP | 56-9464 Y2 | 3/1981 |
| JP | 58-18545 U | 7/1983 |
| JP | 63-84239 U | 6/1988 |
| JP | 63-111146 U | 7/1988 |
| JP | 63-114649 U | 7/1988 |
| JP | 11-503627 A | 3/1999 |
| JP | 2004-267776 A | 9/2004 |
| WO | 89/00836 A1 | 2/1989 |
| WO | 96/29113 A1 | 9/1996 |

* cited by examiner

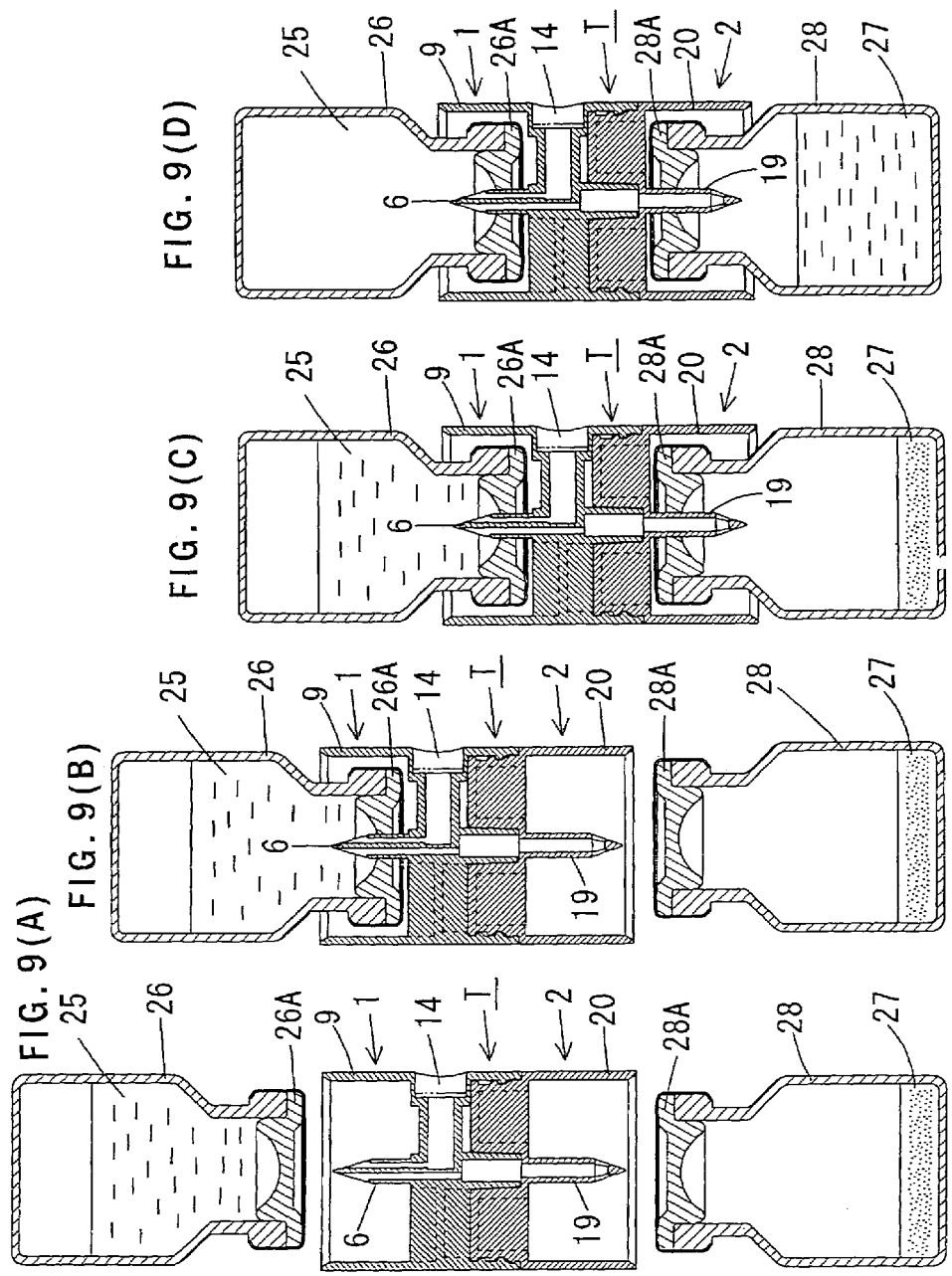

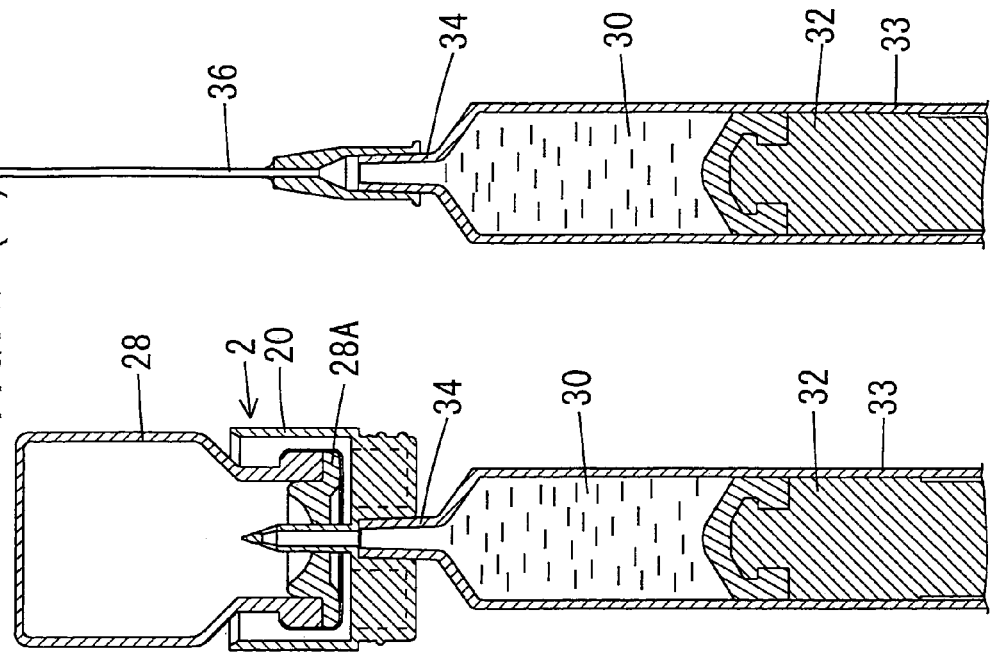
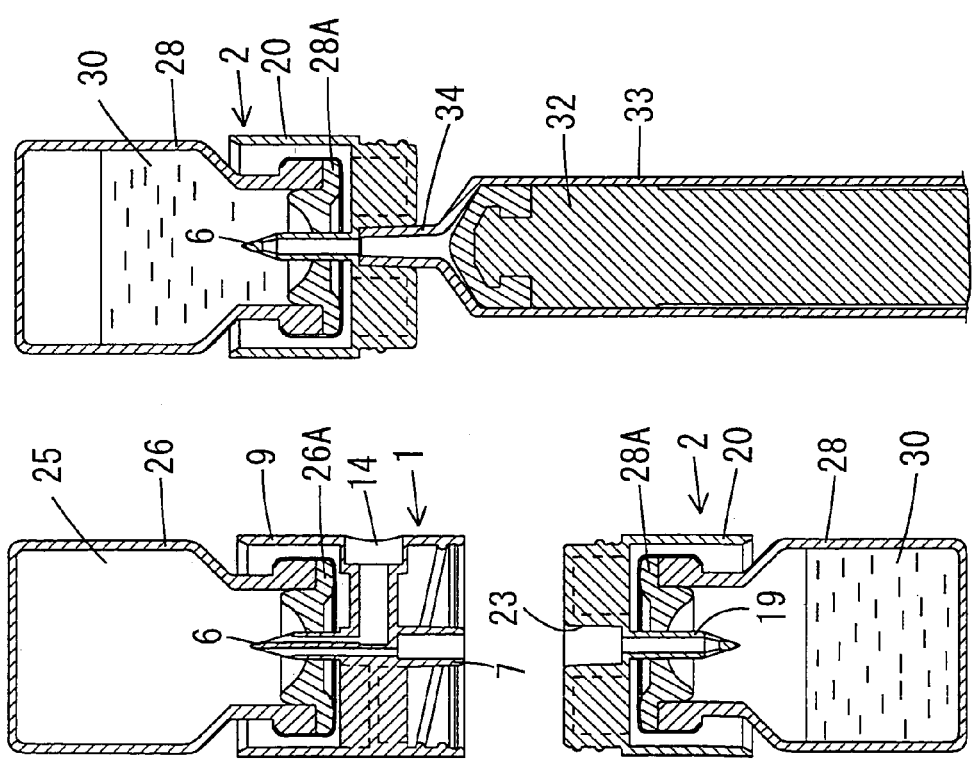
FIG. 10(A) FIG. 10(B) FIG. 10(C) FIG. 10(D)

FIG. 23
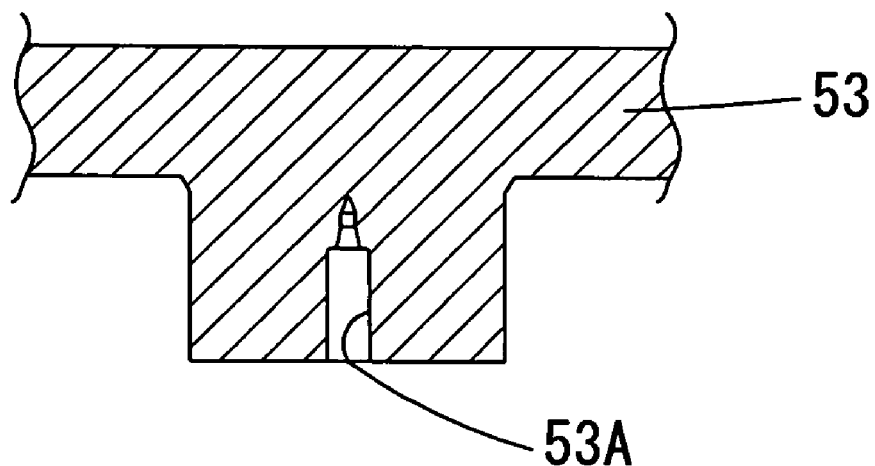
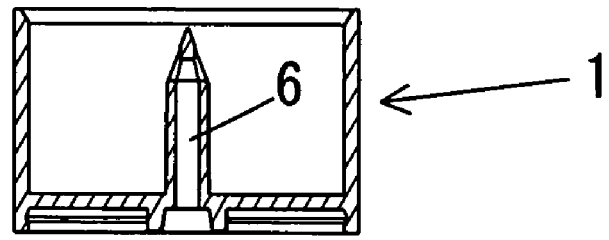
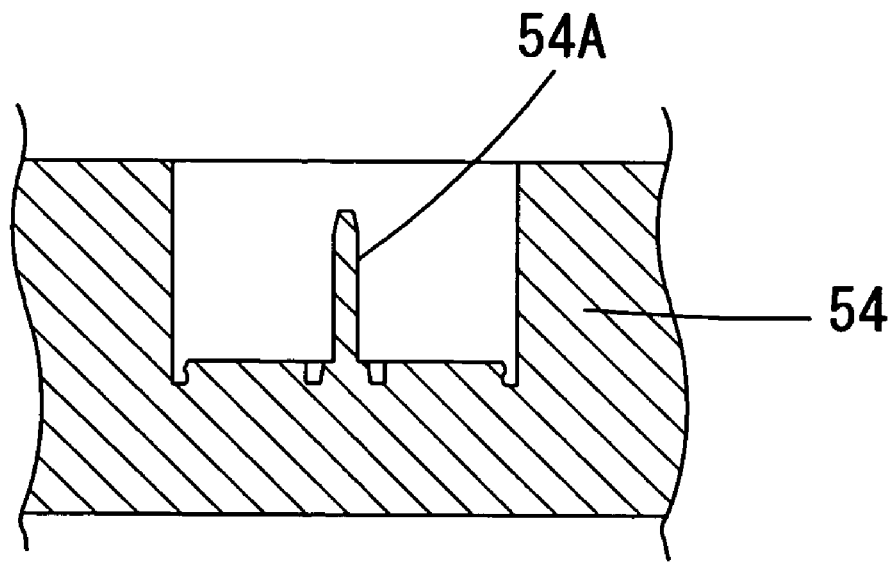

Prior Art

TRANSFER NEEDLE

The present application claims priority to Japanese Application No. 2003-275735 filed Jul. 17, 2003.

BACKGROUND OF THE INVENTION

1. Field of the Invention

The present invention relates to a transfer needle and, more specifically, to a transfer needle that enables safe, easy and reliable injection of liquid such as solvent or drug solution from its own container into a container with medicament contained therein, when dissolving the medicament in liquid such as solvent or drug solution and preparing drug solution for preparing fluid infusion and the like.

2. Description of the Related Art

Medicaments which are chemically unstable and may change their natures in a state of fluid infusion, such as antibiotics, anticancer agent, or blood preparation, are normally stored in a vial sealed with a rubber plug in a freeze-dried state, and then those medicaments are dissolved in a solvent such as distilled water, physiological salt solution, or glucose liquid and drug solution are prepared immediately before use.

In the most general method used for such dissolving and preparing procedure in the related art, a solvent is sucked out from a container containing the solvent by using a metallic hollow needle and a syringe and injected into a container with a medicament therein, and then the medicament is dissolved in the solvent to prepare a drug solution, and the prepared drug solution is returned to the syringe. However, this method is not only complicated, but also associated with a risk of accidental puncture by the metallic hollow needle. Therefore, various types of transfer needles which can perform dissolving and preparing procedure safely, easily and reliably are proposed (For example, JP56-9464B, JP54-16152B, JP49-47507B).

However, in the transfer needle in the related art, there are problems as described below. That is, the transfer needle is generally formed by injection molding, and thus there arise the following problems. For example, as shown in FIG. 38, a transfer needle 77 comprises a base plate 78, an upper hollow needle 79 projecting upward from the base plate 78, a lower hollow needle 80 projecting downward from the base plate 78 and communicating with the upper hollow needle 79, a skirt 81 provided so as to project upward from the outer peripheral edge of the base plate 78, a skirt 82 provided so as to provide downward from the outer peripheral edge of the base plate 78, and so on. When manufacturing the transfer needle 77 as described above by injection molding, for example, a method of using upper and lower metal molds 83, 84 as shown in FIG. 39, forming an insertion portion 84A to be inserted into an insertion hole 83A of the metal mold 83 on the metal mold 84, and molding the upper hollow needle 79 between the insertion hole 83A and the insertion portion 84A is conceivable.

However, in this method, the length L of the portion to be positioned inside the lower hollow needle 79 plus the insertion portion 84A of the metal mold 84 (this portion is supported to the metal mold 84 only at the lower end) is significantly long, and hence there arises a problem of strength. Therefore, the metal molds 83, 84 as shown in FIG. 40 are used for all practical purposes.

As described above, in the integral transfer needle in the related art, it is necessary to abut the small diameter liquid-specific hollow needle 79 and the medicament-specific hollow needle 80 against each other and mold them together. Therefore, when the metal molds 83, 84 are clamped too tight when molding, the metal molds 83, 84 may be broken. In contrast, when the metal molds 83, 84 are clamped with insufficient force, there arises such problem that flash may be generated at a portion 85 between the metal molds 83 and 84, and hence communication between the liquid-specific hollow needle 79 and the medicament-specific hollow needle 80 becomes defective. In this manner, in the related art, there was a problem in that adjustment a mold clamping force of the metal molds 83, 84 is difficult and hence molding of the transfer needle 77 cannot be performed easily.

In addition, the respective metal molds 83, 84 are formed with elongated ring-shaped holes 83B, 84B for forming hollow needles 79, 80 respectively in the vertical direction. In this case, when the diameters of the ring-shaped holes 83B, 84B are small, it is difficult to form these holes 83B, 84B, and it is further difficult to reduce the diameter of the insertion hole 83A and the insertion portion 84A, which requires a high level of technology. Therefore, when considering the molding stability of the transfer needle 77, the diameters of the ring-shaped holes 83B, 84B are obliged to be larger, and hence the diameters of the respective hollow needles 79, 80 increase correspondingly.

As shown in FIGS. 41(A) to (C), when the hollow needle 71 of the transfer needle is punctured into a rubber plug 72 of a vial 70, such phenomenon that the hollow needle 71 is pressed back by a resiliency of the rubber plug 72, that is, a kick-back phenomenon occurs. However, when the diameter of the hollow needle 71 is large, a force to be pressed back when the hollow needle 71 is punctured into the rubber plug 72 increases correspondingly, whereby the possibility that communication between the hollow needle 71 and the interior of the vial 70 is blocked or the hollow needle 71 comes off the rubber-plug 72 increases.

Also, as shown in FIGS. 37(A) to (C), when the metallic hollow needle 71 of the transfer needle is inserted into the rubber plug 72 of the vial, the cutting edge 73, which is formed like a pointed cutting edge, is punctured into the rubber plug 72 first and inserted into the rubber plug 72 as if it tears the rubber plug 72, and then the rear portion thereof is inserted in sequence into the rubber plug 72. In this case, since the rear (end) portion of the opening edge of the cutting edge 73 of the hollow needle 71, that is, a heel portion 74 is keen, a (coring) phenomenon that rubber material of the rubber plug 72 is cut off by the heel portion 74 tends to occur, whereby there was a possibility that small chips 75 of rubber are mixed into the prepared drug solution. Coring may also occur as in the case that the diameter of the metallic hollow needle 71 is large.

Furthermore, in the related art, when the drug solution is prepared in the vial by using the transfer needle, and then the prepared drug solution in the vial is transferred in turn to the syringe, it was necessary to pull the hollow needle of the transfer needle off the rubber plug of the vial, and then puncture the metallic hollow needle, which is connected to the syringe, again into the rubber plug to suck the prepared drug solution into the syringe. Therefore, there was a problem of generation of coring due to twice-puncture of the needle with respect to the rubber plug.

In order to solve this problem, such technology including the steps of inserting the respective hollow needles of the transfer needles into the rubber plug of the upper and lower vials respectively, mixing solvent and medicament in the both vials and preparing a drug solution, then when the empty upper vial is brought apart from the lower vial upward, bringing the distal (end) portion of the upper hollow needle or the like apart from the main body of the transfer needle, and dropping the distal (end) portion of the lower hollow needle as well in the lower vial, thereby taking the prepared drug solution out from the lower vial by the syringe through the main body of the transfer needle is proposed (for example, JP63-114649U). However, in this technology, since the distal ends or the like of the respective hollow needles remain in the respective vials, it is troublesome to dispose the distal (end) portions of the respective hollow needles and the respective vials separately, and in addition, the possibility to cause a needle-puncturing accident by the distal end portions of the respective hollow needles is high, and hence practical application was difficult.

BRIEF SUMMARY OF THE INVENTION

As a result of earnest investigations made by the inventors to solve the problems associated with the conventional techniques, the present invention has been completed.

It is an object of the present invention is to provide a transfer needle that enables safe, easy and reliable dissolving medicament into liquid, such as solvent or drug solution, and preparing drug solution without causing any other problems, and that enables easy manufacturing of metal molds for the transfer needle and molding it.

The above-mentioned object and other objects of the present invention will be clarified further more in the following description, and these objects are attained by the present invention comprising the constitution mentioned below.

The present invention relates to a transfer needle comprising:

a liquid-specific member; and a medicament-specific member to be separably connected or joined to the liquid-specific member in a liquid-tight state, the liquid-specific member comprising:

a liquid-specific hollow needle projecting toward the opposite side from the medicament-specific member, the medicament-specific member comprising:

a medicament-specific hollow needle projecting toward the opposite side from the liquid-specific member and communicating with the liquid-specific hollow needle.

A transfer needle may comprise:

a female luer provided on at least one of the liquid-specific member and the medicament-specific member at a position opposing to the other, the female luer communicating with the one hollow needle and being separably connected with an injection needle connecting portion of a syringe in a liquid-tight state.

The liquid-specific member and the medicament-specific member may be connected by engaging means.

The liquid-specific hollow needle may comprise:

a liquid channel communicated with the medicament-specific hollow needle; and an air channel, and wherein the liquid-specific member comprises a communication channel for bringing the air channel into communication with the outside.

The communication channel may be provided with a filter.

The liquid-specific hollow needle and/or the medicament-specific hollow needle may comprise;

a cylindrical proximal portion formed with an opening; and a pointed distal portion.

The liquid-specific hollow needle and/or the medicament-specific hollow needle may comprise;

a cylindrical proximal portion; and a pointed distal portion formed with an opening.

The female luer may be provided with a filter.

The liquid-specific member may comprise:

a skirt projecting toward the opposite side from the medicament-specific member and enclosing the liquid-specific hollow needle, and wherein the medicament-specific member comprises:

a skirt projecting toward the opposite side from the liquid-specific member and enclosing the medicament-specific hollow needle.

The liquid-specific member and the medicament-specific member may be connected by a hinge having flexibility and being breakable.

The liquid-specific member and the medicament-specific member may be disengageably engaged, and wherein means for preventing disengagement is provided.

A transfer needle may comprise:

a liquid-specific member; and a medicament-specific member integrally formed with the liquid-specific member, the liquid-specific member comprising:

a liquid-specific hollow needle projecting toward the opposite side from the medicament-specific member, the medicament-specific member comprising:

a medicament-specific hollow needle projecting toward the opposite side from the liquid-specific member and being in communication with the liquid-specific hollow needle, an insertion hole being formed between the liquid-specific hollow needle and the medicament-specific hollow needle and opening toward the side, an insertion body being inserted into the insertion hole so as to communicate the both hollow needles with each other.

The liquid-specific hollow needle and/or the medicament-specific hollow needle may comprise two openings at distal portions thereof.

An air channel communicating with the liquid-specific hollow needle may be formed, the air channel comprising a filter.

The insertion body may be integrally formed via a hinge.

BRIEF DESCRIPTION OF THE DRAWINGS

FIGS. 1 to 10 show a first embodiment of the present invention, and FIG. 1 is a front view.

FIG. 2 is a cross-sectional view taken along line A-A of FIG. 1.

FIG. 3 is a vertical cross-sectional view of a liquid-specific member in FIG. 2.

FIG. 4 is a plan view of FIG. 3.

FIG. 5 is a bottom view of FIG. 3.

FIG. 6 is a vertical cross-sectional view of a medicament-specific member in FIG. 2.

FIG. 7 is a plan view of FIG. 6.

FIG. 8 is a bottom view of FIG. 6.

FIG. 9 is an explanatory cross-sectional view showing a method of dissolving and preparing drug solution according to the first embodiment of the present invention.

FIG. 10 is an explanatory cross-sectional view showing a method of dissolving and preparing drug solution according to the first embodiment of the present invention.

FIG. 11 is a vertical cross-sectional view.

FIG. 12 is a vertical cross-sectional view of a liquid-specific member in FIG. 11.

FIG. 13 is a vertical cross-sectional view of a medicament-specific member in FIG. 11.

FIG. 14 is a vertical cross-sectional view.

FIG. 15 is a vertical cross-sectional view showing an exploded state of FIG. 14.

FIG. 16 is a vertical cross-sectional view of FIG. 15 showing a state in use.

FIGS. 17 to 23 show a fourth embodiment of the present invention, and FIG. 17 is a vertical cross-sectional view.

FIG. 18 is a vertical cross-sectional view of a liquid-specific member in FIG. 17.

FIG. 19 is a vertical cross-sectional view of a medicament-specific member in FIG. 17.

FIG. 20 is a vertical cross-sectional view showing a molding method of a liquid-specific member in FIG. 18.

FIG. 21 is a vertical cross-sectional view showing a molding method of a liquid-specific member in FIG. 18.

FIG. 22 is a vertical cross-sectional view showing a molding method of a liquid-specific member in FIG. 18.

FIG. 23 is a vertical cross-sectional view showing a molding method of a liquid-specific member in FIG. 18.

FIG. 24 is a vertical cross-sectional view.

FIG. 25 is a vertical cross-sectional view showing a liquid-specific member in FIG. 24.

FIG. 26 is a front view of FIG. 25.

FIG. 27 is a vertical cross-sectional view showing a medicament-specific member in FIG. 24.

FIG. 28 is a front view of FIG. 27.

FIG. 29 is a vertical cross-sectional view.

FIG. 30 is a vertical cross-sectional view showing an exploded state of FIG. 29.

FIG. 31 is a vertical cross-sectional view.

FIG. 32 is a vertical cross-sectional view showing an exploded state of FIG. 31.

FIG. 33 is a vertical cross-sectional view.

FIG. 34 is a vertical cross-sectional view showing an exploded state of FIG. 33.

FIG. 35 is a vertical cross-sectional view.

FIG. 36 is a vertical cross-sectional view showing an exploded state of FIG. 35.

DETAILED DESCRIPTION OF THE INVENTION

Figure 1:
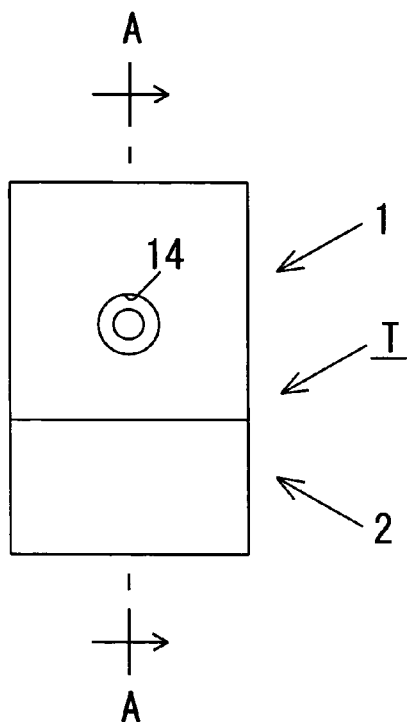
Figure 2:
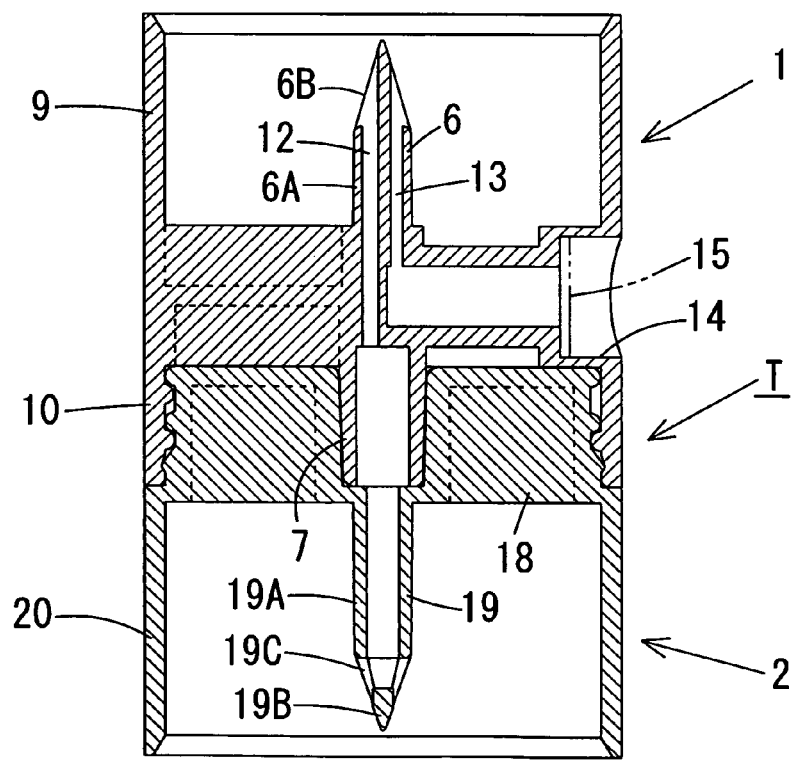
Figure 3:
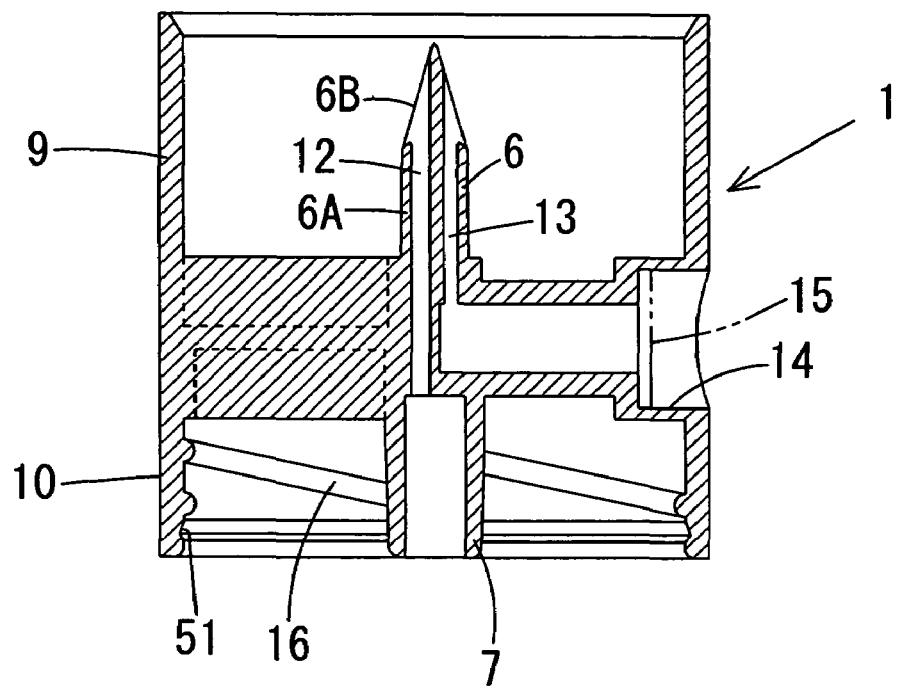
Figure 4:
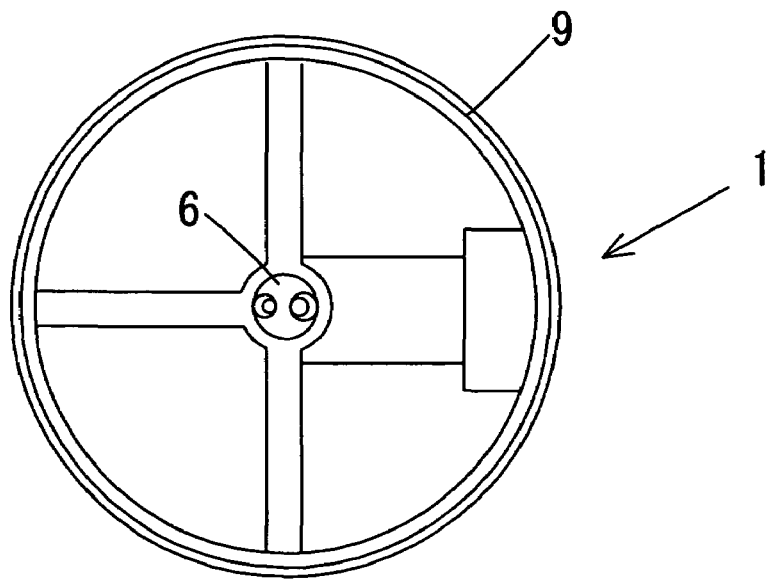
Figure 5:
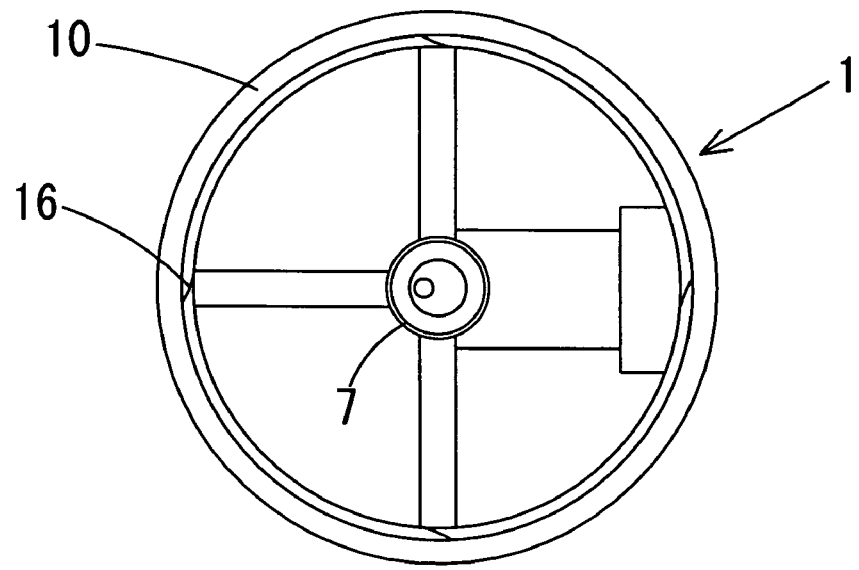
Figure 6:
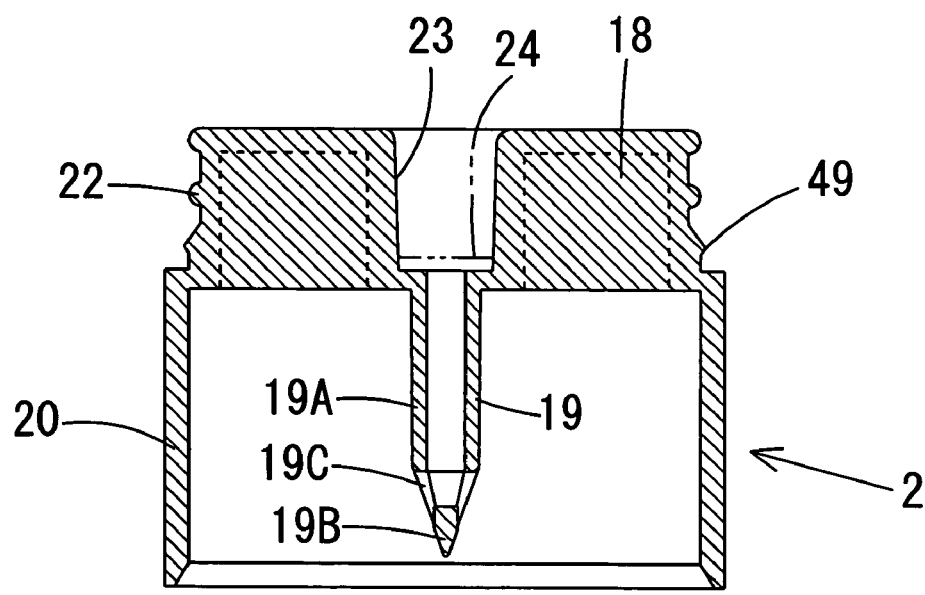
Figure 7:
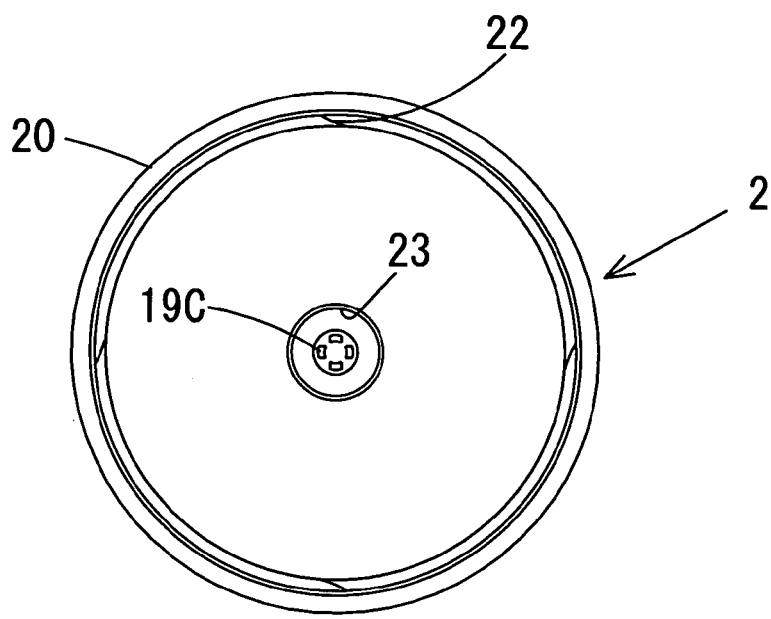
Figure 8:
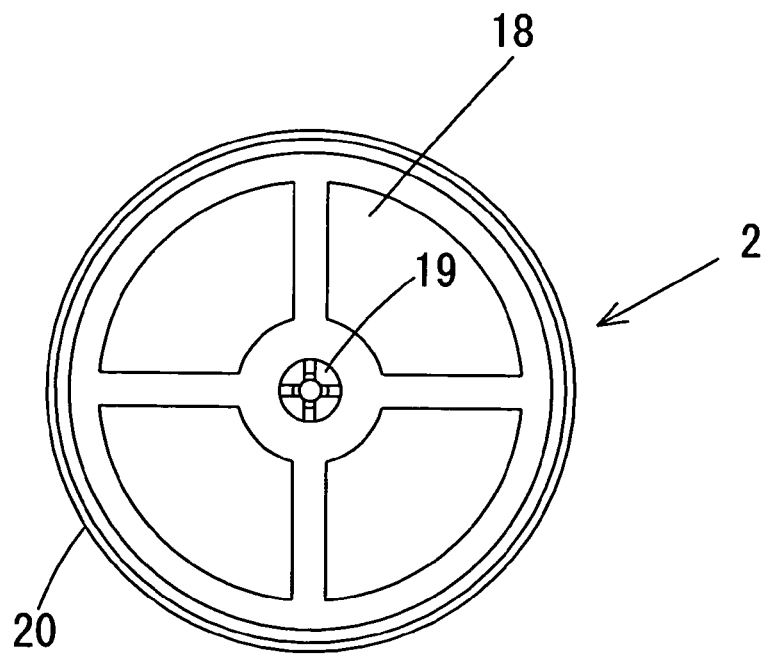

Referring now to FIG. 1 to FIG. 10, a first embodiment of the present invention will be described. As shown in FIG. 1 to FIG. 8, a transfer needle T includes a liquid-specific member 1, and a medicament-specific member 2.

The liquid-specific member 1 includes a liquid-specific hollow needle 6, a joint portion 7, a skirt 9, and a fitting portion 10, and is integrally formed of hard (or soft) plastic material.

The liquid-specific hollow needle 6 is disposed in the vertical direction and includes a column-shaped proximal portion 6A, and an upwardly tapered truncated-conical-shaped distal portion 6B. The liquid-specific hollow needle 6 is a two-hole type, and a liquid channel 12 is formed so as to penetrate into the vertical direction in a portion extending from a conical surface to a bottom surface on one side (left side in the drawing), while an air channel 13 opening at the conical surface is formed in the vertical direction on the other side (right side in the drawing) of the liquid-specific hollow needle 6. The liquid-specific member 1 is formed with a communication channel 14 in the radial direction, which is communicated with the air channel 13 of the liquid-specific hollow needle 6 at an inner end portion thereof, and opened toward the outside at an outer end portion thereof. The communication channel 14 may be provided with a filter 15 for preventing microorganism's contamination of the interior of the transfer needle T, as shown by an imaginary line in FIG. 2 and FIG. 3.

The joint portion 7 configures means for connecting the liquid-specific member 1 and medicament-specific member 2 in a "liquid-tight state" together with a female luer 23, described later, of the medicament-specific member 2, is disposed in the vertical direction below the liquid-specific hollow needle 6 so as to be continued therefrom, is formed into a cylindrical shape communicating with the liquid channel 12 of the liquid-specific hollow needle 6, and opens downward. An outer peripheral surface of the joint portion 7 extends downward in a tapered shape.

The skirt 9 is a member fitted on a vial for guiding puncture when the liquid-specific hollow needle 6 is punctured into a rubber plug of the vial, is formed into a cylindrical shape, and is disposed on an upper side of an outer periphery of the liquid-specific member 1 so as to extend upright. The liquid-specific hollow needle 6 is disposed at the center of the skirt 9, and is completely enclosed and covered by the skirt 9. Accordingly, there is little risk of accidental puncture by the liquid-specific hollow needle 6.

The fitting portion 10 has a cylindrical shape disposed on a lower side of an outer periphery of the liquid-specific member 1 so as to extend downward. The joint portion 7 is disposed at the center of the fitting portion 10 so as to be covered thereby. An upper side of an inner peripheral surface of the fitting portion 10 corresponds to a threaded portion 16 formed with a thread thereon. A peripheral groove 51 is formed on an inner peripheral surface of an lower end portion of the fitting portion 10.

The medicament-specific member 2 is detachably connected to the liquid-specific member 1 from below in a liquid-tight state, and includes a base body 18, a medicament-specific hollow needle 19, and a cylindrical skirt 20 formed integrally of hard (or soft) plastic material.

An upper side of an outer peripheral surface of the base body 18 is formed with a thread, which corresponds to a threaded portion 22 to be screwed into the treaded portion 16 of the liquid-specific member 1, and an lower side of the outer peripheral surface is formed with a peripheral projection 49 to be detachably engaged with the peripheral groove 51 via resilient deformation. The peripheral groove 51 and the peripheral projection 49 are engaged by screwing the threaded portion 16 onto the threaded portion 22, while engagement between the peripheral groove 51 and the peripheral projection 49 is released and hence connection between the liquid-specific member 1 and medicament-specific member 2 is released by exerting a force to release the above-described screwing. The female luer 23 opening in the vertical direction is formed at the center of the base body 18, and the female luer 23 is a tapered hole tapering downward. The female luer 23 is a member in which the joint portion 7 is inserted and separably connected, when the medicament-specific member 2 is connected to the liquid-specific member 1, so that the tapered-shaped outer peripheral surface of the joint portion 7 is in close-contact with a tapered-shaped inner surface of the female luer 23 in a liquid-tight state. And when the liquid-specific member 1 and the medicament-specific member 2 is separated, an injection needle connecting portion of a syringe is inserted and separably connected in the female luer 23, so that a tapered-shaped outer peripheral surface of the injection needle connecting portion is in close-contact with the tapered-shaped inner surface of the female luer 23 in a liquid-tight state. There may be the case in which a filter 24 for preventing residual of medicament, which could not melt, from passing through and removing foreign substance is provided at the bottom in the female luer 23.

The medicament-specific hollow needle 19 is disposed in the vertical direction so as to extend downward from a center portion of the base body 18. The medicament-specific hollow needle 19 includes a proximal portion 19A formed into a cylindrical shape and communicating with the female luer 23, and a distal portion 19B formed into a hollow conical shape having a pointed tip facing downward, and the interiors of the proximal portion 19A and the distal portion 19B are communicating with each other. The inner diameter of the proximal portion 19A is smaller than the inner diameter of the female luer 23. The medicament-specific hollow needle 19 is so-called "rocket needle" type having four openings 19C formed at the distal portion 19B at regular intervals in the circumferential direction in the drawing. However, the number of openings 19C is arbitrary. It is also possible to employ the medicament-specific hollow needle 19 of so-called "side hole needle" type having openings at a distal end portion of the proximal portion 19A.

The skirt 20 is provided on a lower end portion of the outer peripheral surface of the base body 18 so as to extend downward, and is configured to be fitted on the medicament-specific hollow needle 19 for guiding the same. The medicament-specific hollow needle 19 is disposed at the center of the skirt 20, and is completely enclosed and covered by the skirt 20. Accordingly, there is little risk of accidental puncture by the medicament-specific hollow needle 19 owing to the existence of the skirt 20.

Subsequently, a dissolving procedure of the medicament into liquid such as solvent or drug solution and a preparing procedure of drug solution by using the transfer needle T of the present invention and suction of the prepared drug solution into a syringe made via this preparation procedure will be described referring to FIG. 9 and FIG. 10. As shown in FIG. 9(A), a vial 26 containing liquid 25 such as solvent or drug solution, a vial 28 containing medicament 27, and the transfer needle T are prepared first. Then, as shown in FIG. 9(B), the vial 26 containing liquid 25 is inserted into the skirt 9 of the liquid-specific member 1 of the transfer needle T, and then the liquid-specific hollow needle 6 of the liquid-specific member 1 is punctured and inserted into a rubber plug 26A of the vial 26.

Subsequently, as shown in FIG. 9(C), the vial 28 containing the medicament 27 is inserted into the skirt 20 of the medicament-specific member 2 of the transfer needle T, and then the medicament-specific hollow needle 19 of the medicament-specific member 2 is punctured and inserted into a rubber plug 28A of the vial 28. Accordingly, as shown in FIG. 9(D), the liquid 25 in the vial 26 is flown through the liquid channel 12 of the liquid-specific hollow needle 6, the joint portion 7, the female luer 23, and the medicament-specific hollow needle 19 of the transfer needle T into the vial 28 containing the medicament 27, and then the medicament 27 is dissolved in the liquid 25 so that a prepared drug solution 30 is obtained.

Subsequently, as shown in FIG. 10(A), after the liquid-specific member 1 and the medicament-specific member 2 are separated, an injection needle connecting portion 34 of a syringe 33 is inserted into the female luer 23 of the medicament-specific member 2 to separably connect thereto, so that a tapered-shaped outer peripheral surface of the injection needle connecting portion 34 is in close-contact with the tapered-shaped inner surface of the female luer 23 in a liquid-tight state. Then, as shown in FIG. 10(B), the medicament-specific member 2 and the syringe 33 are inverted vertically.

Subsequently, as shown in FIG. 10(C), a plunger 32 of the syringe 33 is pulled to suck the prepared drug solution 30 in the vial 28 into the syringe 33, and the vial 28 and the medicament-specific member 2 are separated from the syringe 33. Then, as shown in FIG. 10(D), an injection needle 36 is connected to the injection needle connecting portion 34 of the syringe 33, so that the prepared drug solution 30 can be injected into a vein or the like of a patient.

According to the embodiment described above, since the female luer 23 which communicates with the medicament-specific hollow needle 19 of the medicament-specific member 2 and receives the injection needle connecting portion 34 of the syringe 33 so as to be separably connected thereto in a liquid-tight state is provided at an portion of the medicament-specific member 2 facing the liquid-specific member 1, it is not necessary to pull out the medicament-specific hollow needle 19 from the rubber plug 28A of the vial 28 and then puncture the metallic hollow needle connected to the syringe again into the rubber plug 28A when moving the prepared drug solution 30 in the vial 28 into the syringe 33 after having prepared the drug solution 30 in the vial 28 by using the transfer needle T. Therefore, there is no risk of generation of coring which may be resulted when the needle is punctured into the rubber plug 28A twice.

In addition, there is no possibility that the distal end portions or the like of the respective hollow needles 6, 19 remain in the vial 28 during the dissolving and preparing procedure described above, and hence it is not necessary to dispose the distal end portions or the like of the respective hollow needles 6, 19 and the vial 28 separately, and furthermore, the possibility of accidental puncture by the distal end portions or the like of the hollow needles 6, 19 is reduced.

As described above, according to the embodiment described above, the dissolving procedure of the medicament into solvent or drug solution and the preparing procedure of drug solution can be performed easily and reliably, the dissolving and preparing procedure can be performed safely and hygienically since the risk of accidental puncture is reduced, and the phenomenon that the rubber material is cut off the rubber plug 28A (coring) hardly occurs when the respective hollow needles 6, 19 are punctured into the rubber plug 28A, whereby the possibility that the small chips of the rubber are mixed into the prepared drug solution is reduced. Generation of coring which may be resulted when the needle is punctured into the rubber plug 28A twice is also prevented.

Figure 11:
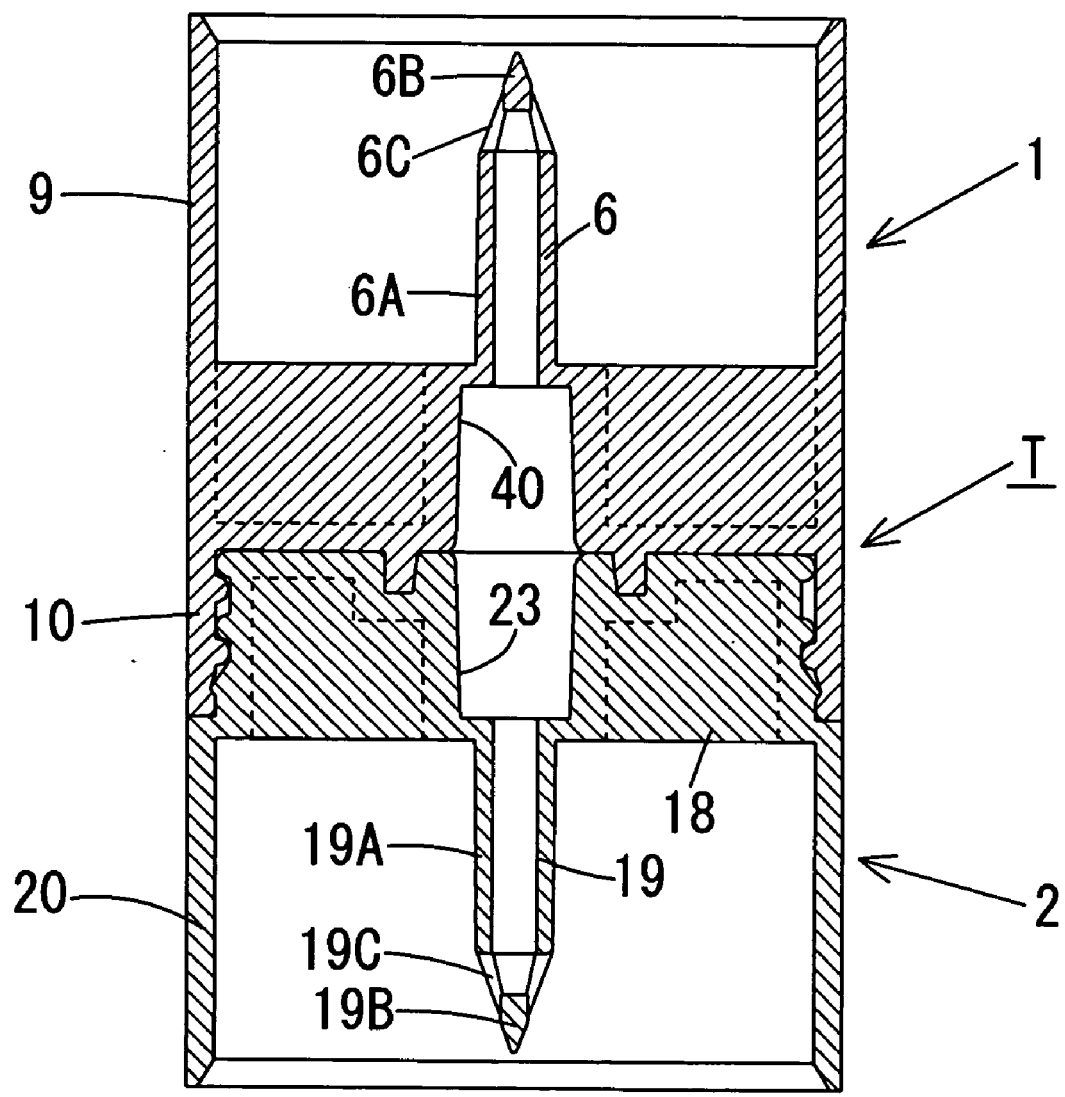
FIGS. 11 to 13 show a second embodiment of the present invention.
Figure 12:
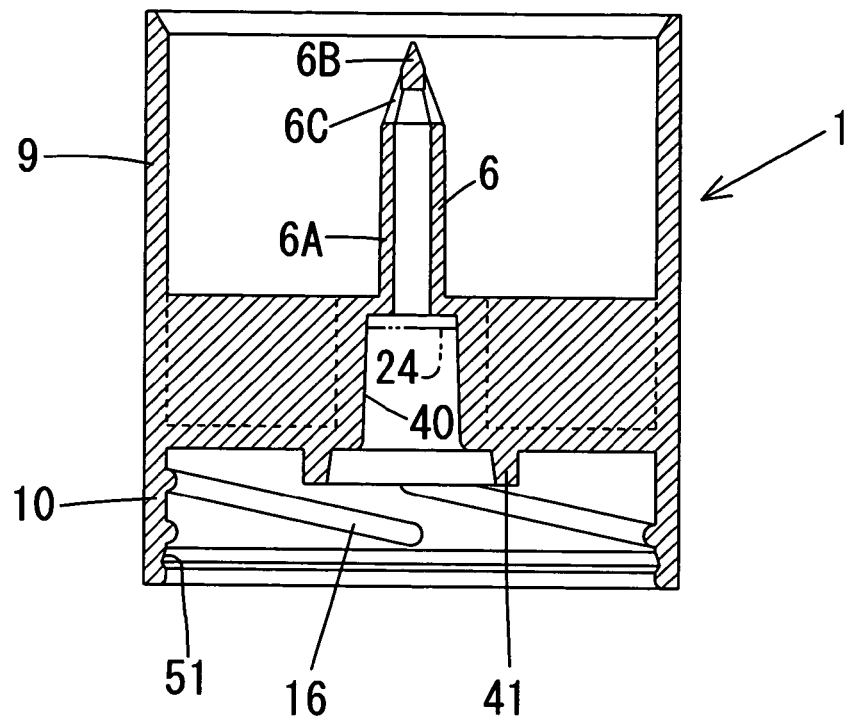
Figure 13:
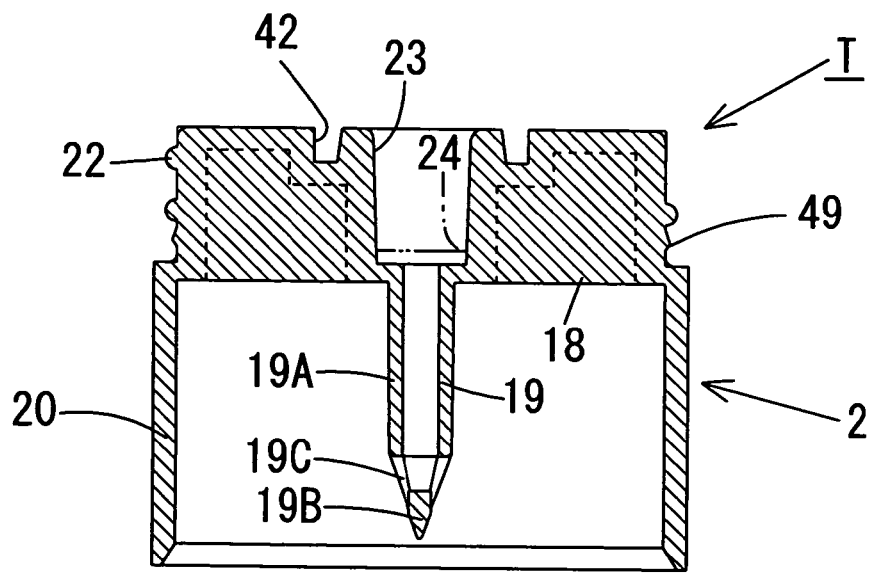

FIG. 11 to FIG. 13 show a second embodiment of the present invention, and is a modification of the first embodiment, where the liquid-specific hollow needle 6 of the liquid-specific member 1 is of so-called "rocket needle" type having four openings 6C at the distal end portion thereof at regular intervals in the circumferential direction in the example shown in these drawings. It is also possible to employ the liquid-specific hollow needle 6 of so-called "side hole needle" type having an opening at the distal end portion or the like of the proximal portion 6A. The liquid-specific member 1 is formed with a female luer 40 opening in the vertical direction below the liquid-specific hollow needle 6, which communicates with the interior of the liquid-specific hollow needle 6, and also communicates with the female luer 23 of the medicament-specific member 2. The female luer 40 is a tapered hole formed so as to taper downward, so that when the liquid-specific member 1 and the medicament-specific member 2 are separated, the injection needle connecting portion of the syringe is inserted therein to be separably connected thereto, so that the tapered-shaped outer peripheral surface of the injection needle connecting portion is in close-contact with a tapered-shaped inner surface of the female luer 40 in a liquid-tight state. The liquid-specific member 1 is formed with a ring-shaped peripheral projection 41 projecting downward from a lower (end) surface thereof, and the base body 18 of the medicament-specific member 2 is formed on an upper (end) surface thereof with a ring-shaped peripheral groove 42 in which the peripheral projection 41 is fitted in a liquid-tight state. In this embodiment, the liquid-specific hollow needle 6 is not formed with an air channel, and a communication channel is not formed in the liquid-specific member 1. In the second embodiment, since the functions of the liquid-specific member 1 and the medicament-specific member 2 are substantially the same, it is also possible to use the liquid-specific member 1 as the medicament-specific member, and the medicament-specific member 2 as the liquid-specific member. In other words, the hollow needle of either one of the members may be punctured to the rubber plug of either one of the vial containing liquid and the vial containing medicament, when dissolving the medicament in liquid such as solvent or drug solution and preparing drug solution dissolving and preparing liquid such as solution or drug solution and medicament, and hence dissolving and preparing procedure can be performed easily. By providing the filters on both of the female luers 23, 40, rubber chips generated by coring or medicament which could not melt, which exist in the vials containing drug solution/medicament, are prevented from being sucked into a syringe.

Figure 14:
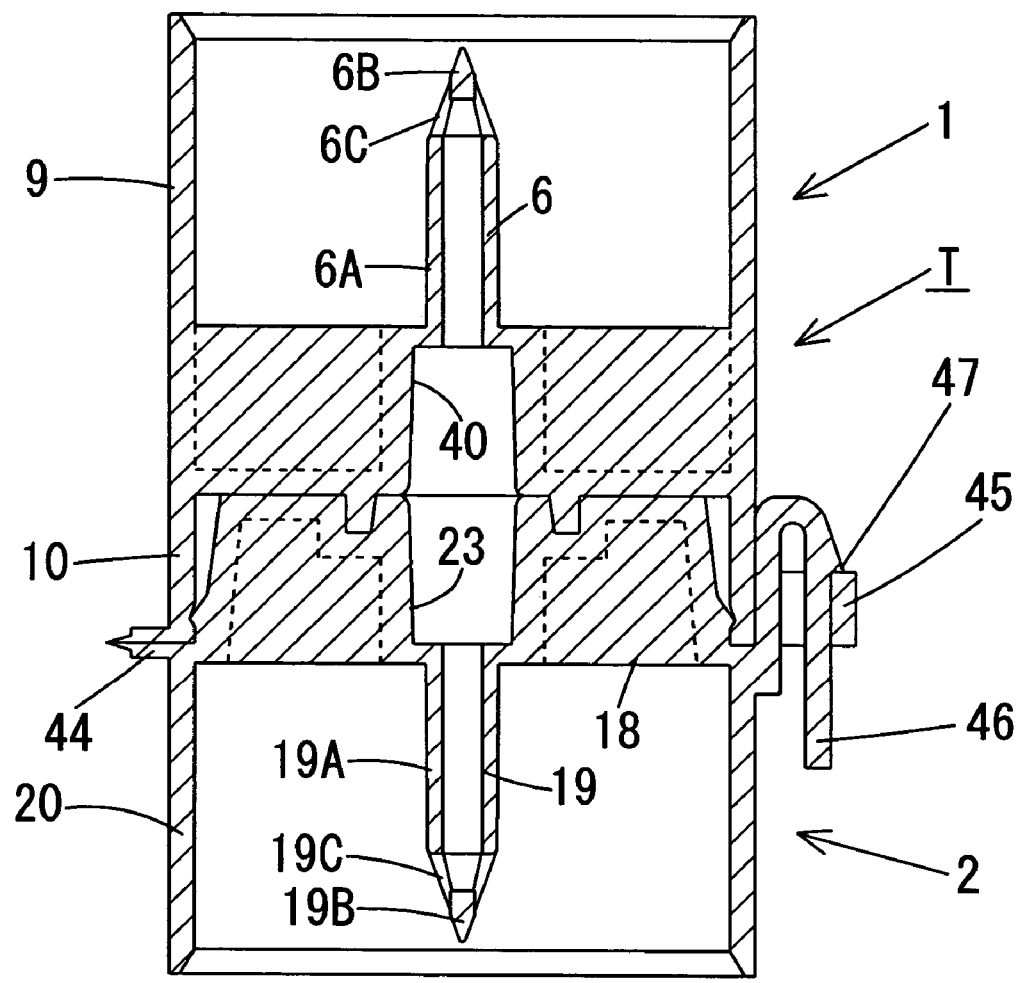
FIGS. 14 to 16 show a third embodiment of the present invention.
Figure 15:
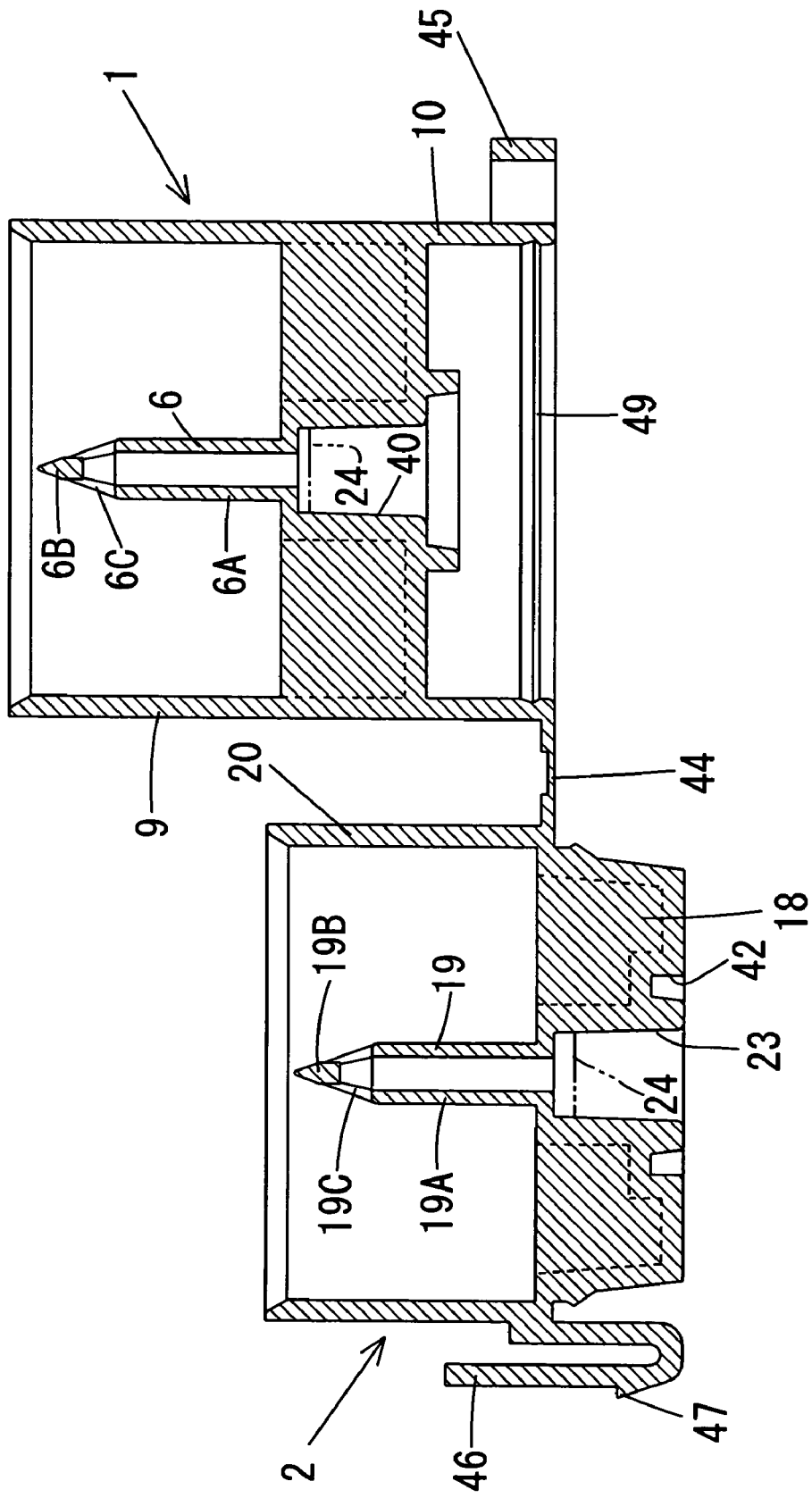
Figure 16:
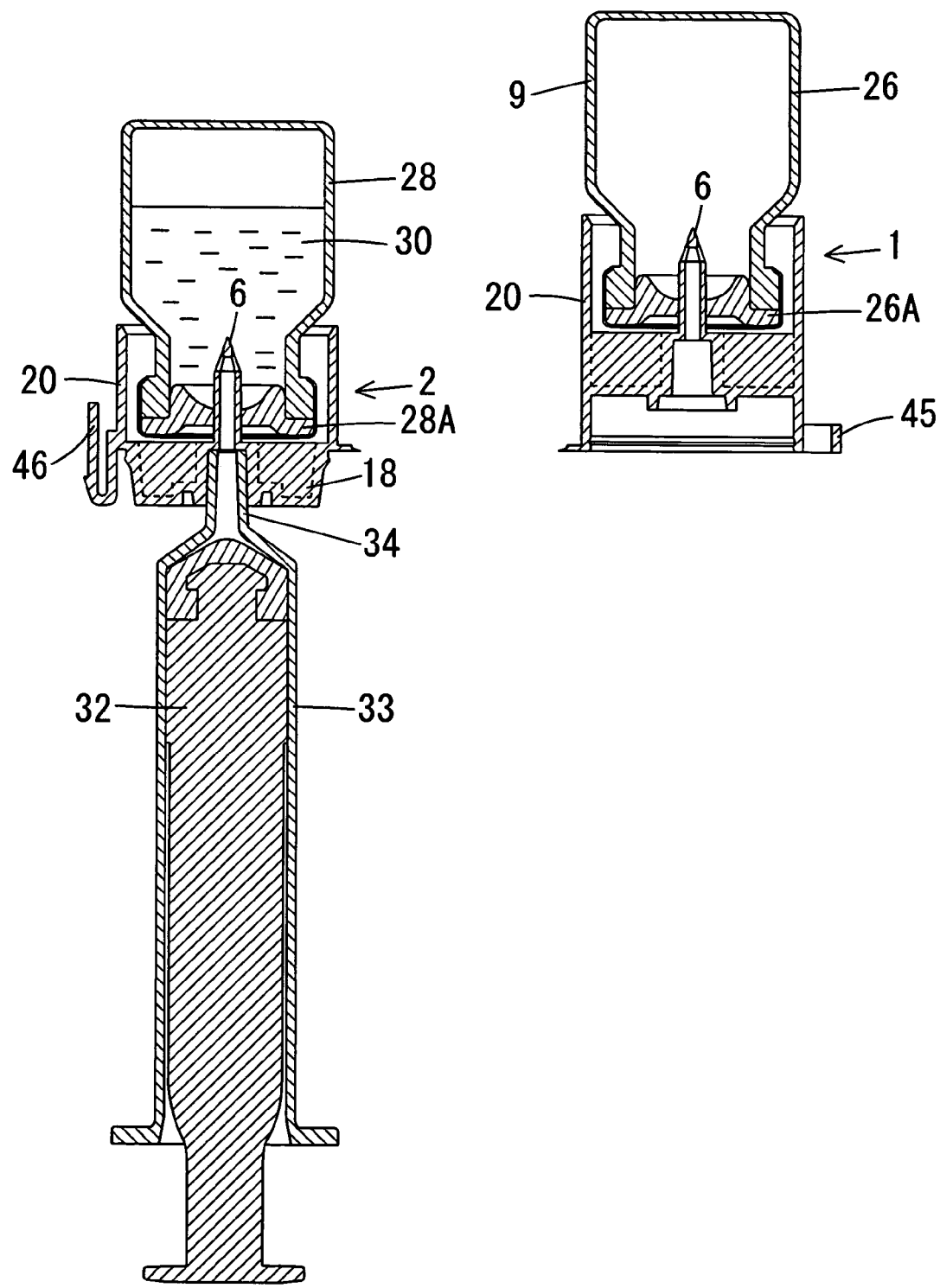

FIG. 14 to FIG. 16 show a third embodiment of the present invention, which is a modification of the second embodiment, in which the fitting portion 10 of the liquid-specific member 1 and the skirt 20 of the medicament-specific member 2 are connected by a breakable hinge 44, and the liquid-specific member 1 and the medicament-specific member 2 are integrally formed. Accordingly, the transfer needle T can be assembled easily for sure, and the number of parts of the transfer needle T can be reduced, so that the part control is facilitated and the transfer needle T can be provided at lower cost. In addition, an engaging ring 45 of U-shape in plan view is provided so as to project radially outwardly from the fitting portion 10 of the liquid-specific member 1, while an engaging strip 46 of substantially U-shape in front view is provided so as to project radially outwardly from the skirt 20 of the medicament-specific member 2. When connecting the liquid-specific member 1 and the medicament-specific member 2, the engaging strip 46 is inserted in and engaged with the engaging ring 45 via resilient deformation. A retaining portion 47 projecting radially outwardly is integrally formed on an outer surface of an lower portion of the engaging strip 46, and accidental disconnection between the engaging strip 46 and the engaging ring 45, that is, accidental disengagement between the liquid-specific member 1 and the medicament-specific member 2 can be prevented by the retaining portion 47 engaged with the engaging ring 45. The engaging ring 45 and the retaining portion 47 constitute disengagement preventing means for the liquid-specific member 1 and the medicament-specific member 2.

According to the embodiment described above, when sucking the prepared drug solution 30 into the syringe 33 after separating the liquid-specific member 1 and the medicament-specific member 2, engagement between the engaging ring 45 and the engaging strip 46 is released, then an external force, which acts to tear the hinge 44, is exerted to the hinge 44 to break the same, and then the liquid-specific member 1 and the medicament-specific member 2 are separated. Subsequently, the injection needle connecting portion 34 of the syringe 33 is connected to the female luer 23 of the medicament-specific member 2, so that the tapered-shaped outer peripheral surface of the injection needle connecting portion 34 is in close-contact with the tapered-shaped inner surface of the female luer 23 in a liquid-tight state.

Figure 17:
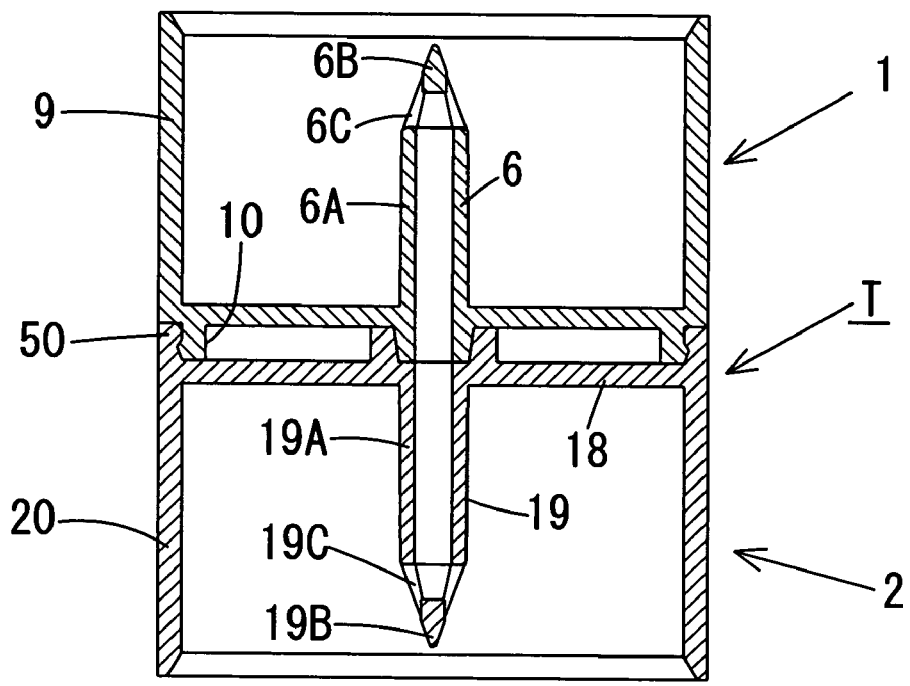
Figure 18:
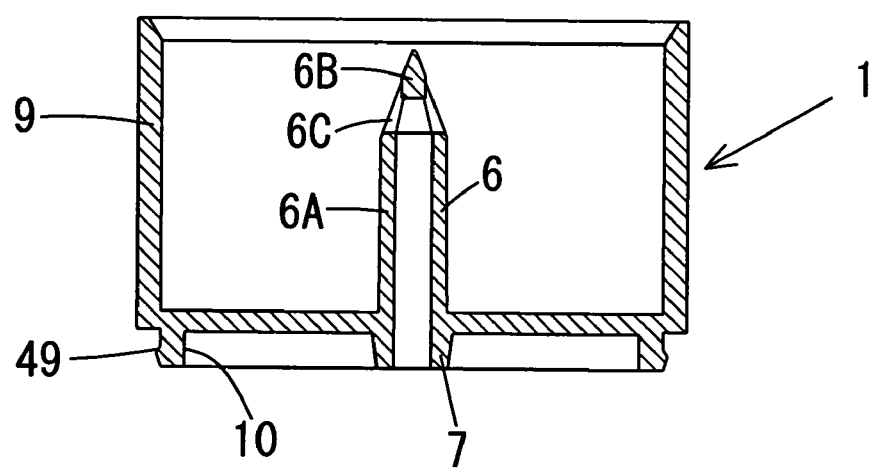
Figure 19:
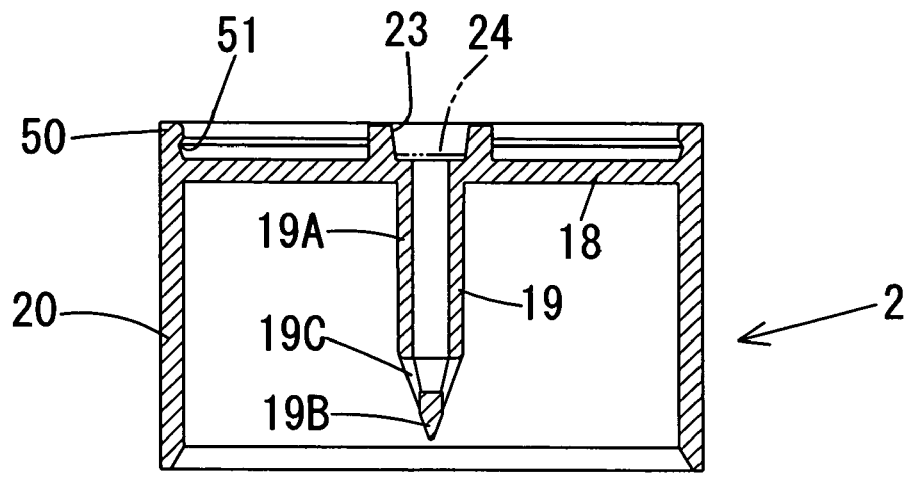

FIG. 17 to FIG. 23 show a fourth embodiment of the present invention. As shown in FIG. 17 to FIG. 19, the fitting portion 10 of the liquid-specific member 1 is formed with the peripheral projection 49 on the outer peripheral surface thereof. The base body 18 of the medicament-specific member 2 is provided with a cylindrical outer fitting portion 50 projecting from an upper end portion of the outer periphery thereof, which is fitted on the fitting portion 10, and the outer fitting portion 50 is formed with the peripheral groove 51 which engages the peripheral projection 49 on an inner peripheral surface thereof.

Figure 20:
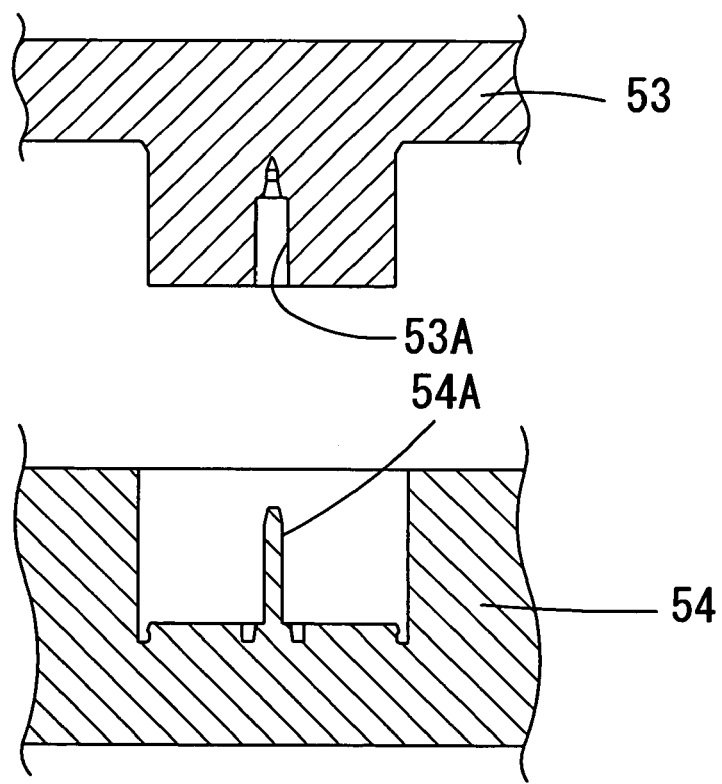
Figure 21:
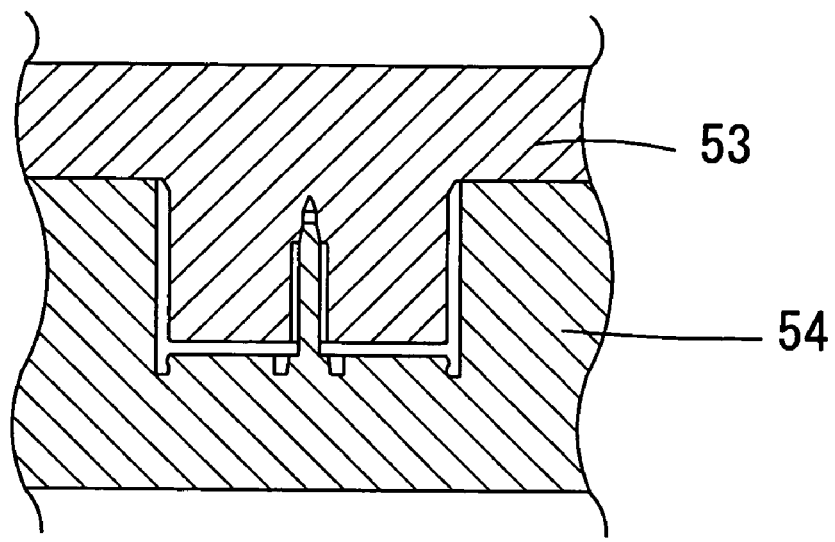
Figure 22:
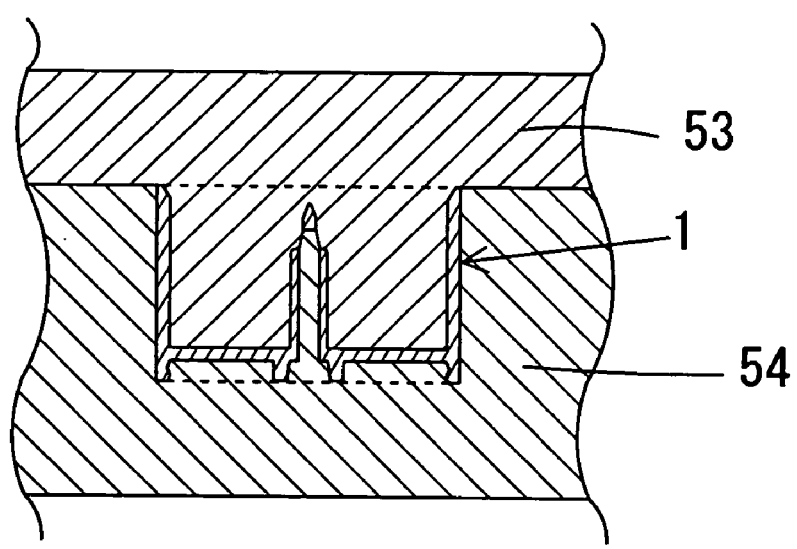
Figure 24:
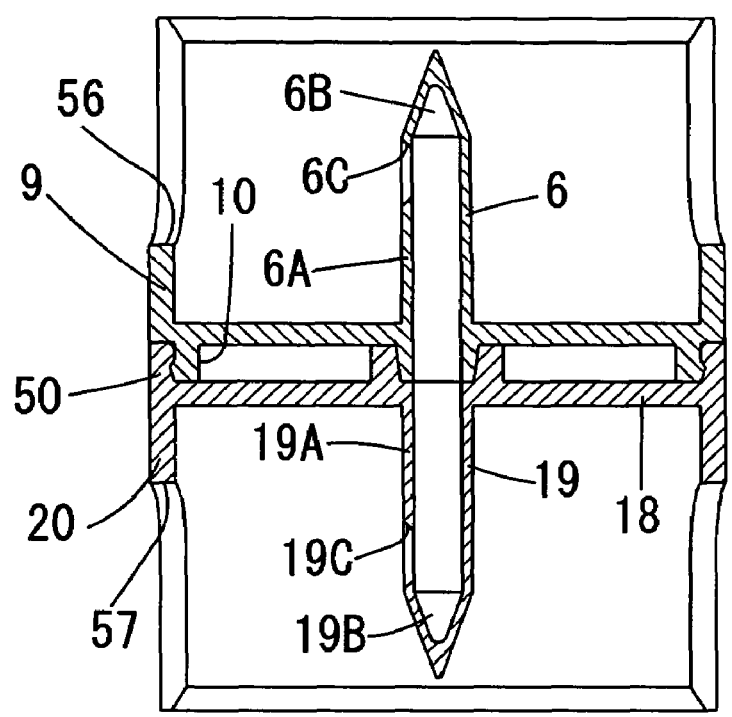
FIGS. 24 to 28 show a fifth embodiment of the present invention.
Figure 25:
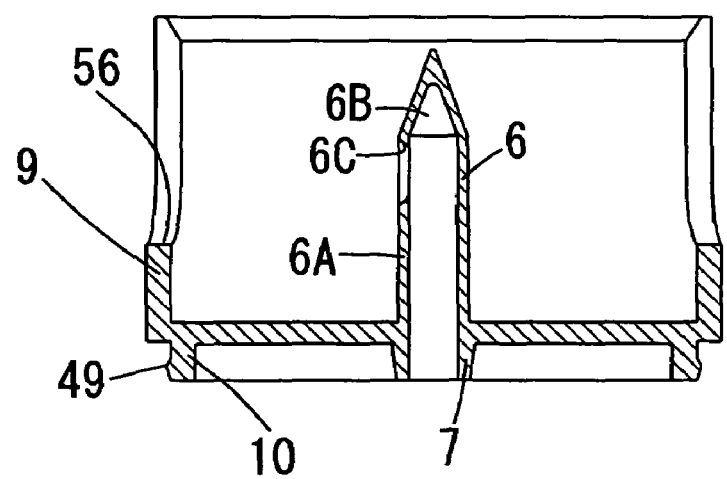
Figure 26:
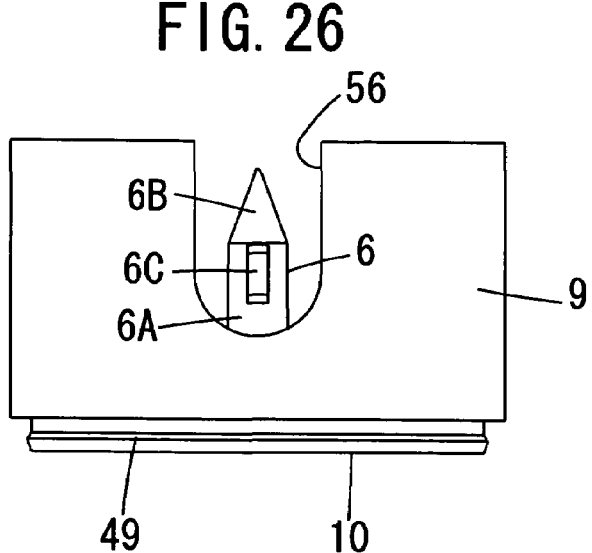
Figure 27:
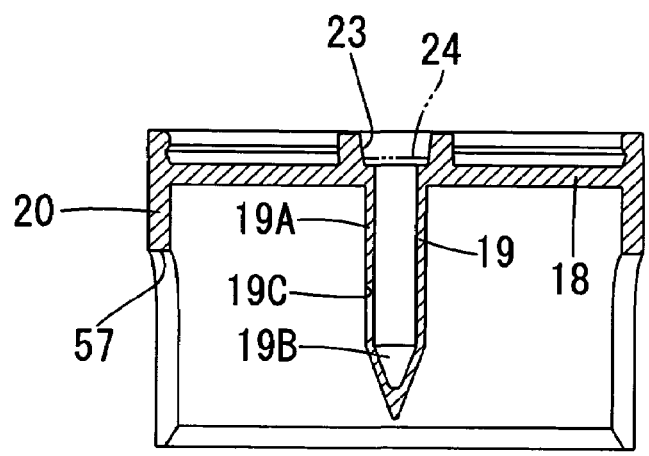
Figure 28:
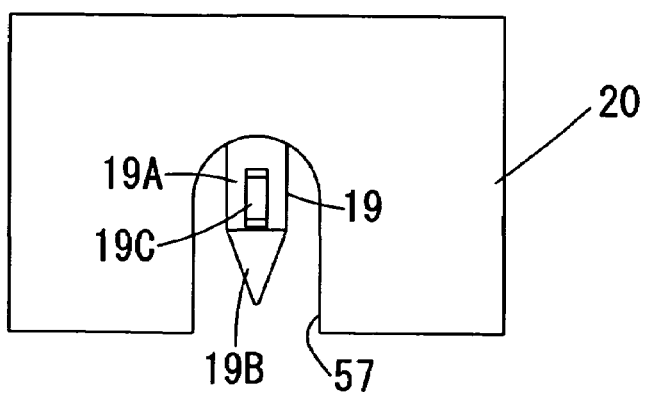

Subsequently, a method of molding the transfer needle will be described by taking the liquid-specific member 1 of the fourth embodiment as an example. However, the medicament-specific member 2 of a fourth embodiment, or the liquid-specific member 1 or the medicament-specific member 2 for other embodiments may be molded in the same manner. The liquid-specific member 1 of the forth embodiment is molded as shown in FIG. 20 to FIG. 23. In other words, FIG. 20 shows an initial state of an upper and a lower metal molds 53, 54, FIG. 21 shows a state in which both of the metal molds 53, 54 are clamped (squeezed), FIG. 22 shows a state of injection molding, and FIG. 23 shows a state of taking out the medicament-specific member 2. Reference numeral 53A shows an insertion hole, reference numeral 54A shows an insertion portion to be inserted into the insertion hole 53A, and the liquid-specific hollow needle 6 is molded therebetween.

In the present invention, since the transfer needle T is a separate type including the liquid-specific member 1 having the liquid-specific hollow needle 6 and the medicament-specific member 2 having the medicament-specific hollow needle 19, the lower end of the insertion portion 54A for molding the liquid-specific hollow needle 6 is directly supported by the lower metal mold 54, and the length from an upper (distal) end of the insertion portion 54A to the supporting portion, which supports the insertion portion 54A, of the lower metal mold 54 is short. Therefore, there exists no problem about the strength of the insertion portion 54A. Accordingly, since the liquid-specific hollow needle 6 can be molded by the metal molds 53, 54, the small-diameter liquid-specific hollow needle 6 can be molded easily (it is the same in the case of the medicament-specific hollow needle 19).

Therefore, when the hollow needles 6, 19 of the transfer needle T is punctured into the rubber plug of the vial, a phenomenon that the hollow needles 6, 19 are pressed back by a resiliency of the rubber plug, that is, the kick-back phenomenon can be prevented, and the force that the hollow needles 6, 19 are pressed back from the rubber plug may be reduced, whereby the risk of blockage of communication between the respective hollow needles 6, 19 and the interior of the vial or accidental disconnection of the respective hollow needles 6, 19 from the rubber plug can be reduced, whereby coring can be prevented.

In the integral transfer needle in the related art, it is necessary to abut a liquid-specific hollow needle and a medicament-specific hollow needle against each other and mold them together, adjustment of the clamping of an upper and a lower metal molds is troublesome, and hence molding of the transfer needle cannot be performed easily. Therefore, there was a risk of breakage of the upper and lower metal molds or generation of flash during molding, which may result in defect of communication between the liquid-specific hollow needle and the medicament-specific hollow needle. However, such risk may be avoided in the present invention.

FIG. 24 to FIG. 28 show a fifth embodiment of the present invention, in which the liquid-specific hollow needle 6 and the medicament-specific hollow needle 19 include openings 6C, 19C at the distal (end) portions of the proximal portions 6A, 19A, that is, so called "side hole needle" type. In order to mold the side hole needle, the respective skirts 9, 20 of the liquid-specific member 1 and the medicament-specific member 2 are formed with molding recesses 56, 57.

According to the embodiment described above, since the liquid-specific hollow needle 6 and the medicament-specific hollow needle 19 include the openings 6C, 19C at the distal (end) portions of the proximal portions 6A, 19A, that is, of so-called "side hole needle" type, when the medicament-specific hollow needle 19 is punctured into the rubber plug of the vial, occurrence of coring may be prevented. Also, when the liquid in the vial is flown into the vial containing the medicament therein via the liquid-specific hollow needle 6, the joint portion 7, the female luer 23, and the medicament-specific hollow needle 19 of the transfer needle T during dissolving the medicament in liquid such as solvent or drug solution and preparing drug solution, the liquid is injected from the opening 19C of the medicament-specific hollow needle 19 of the "side hole needle" type, runs along the wall surface of the vial containing the medicament, and reaches the medicament. Therefore, bubbling during the dissolving and preparing procedure may be alleviated.

Figure 29:
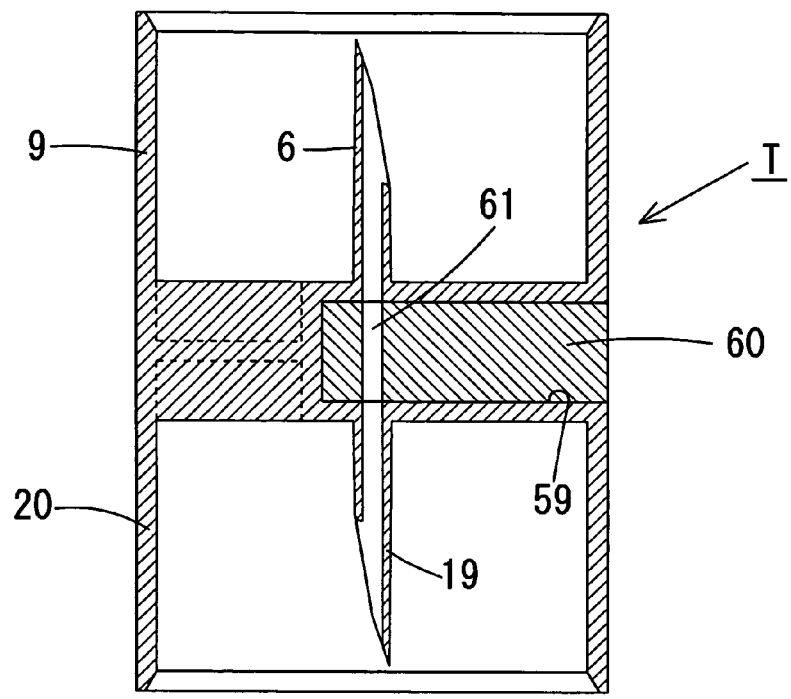
FIG. 29 and FIG. 30 show a sixth embodiment of the present invention.
Figure 30:
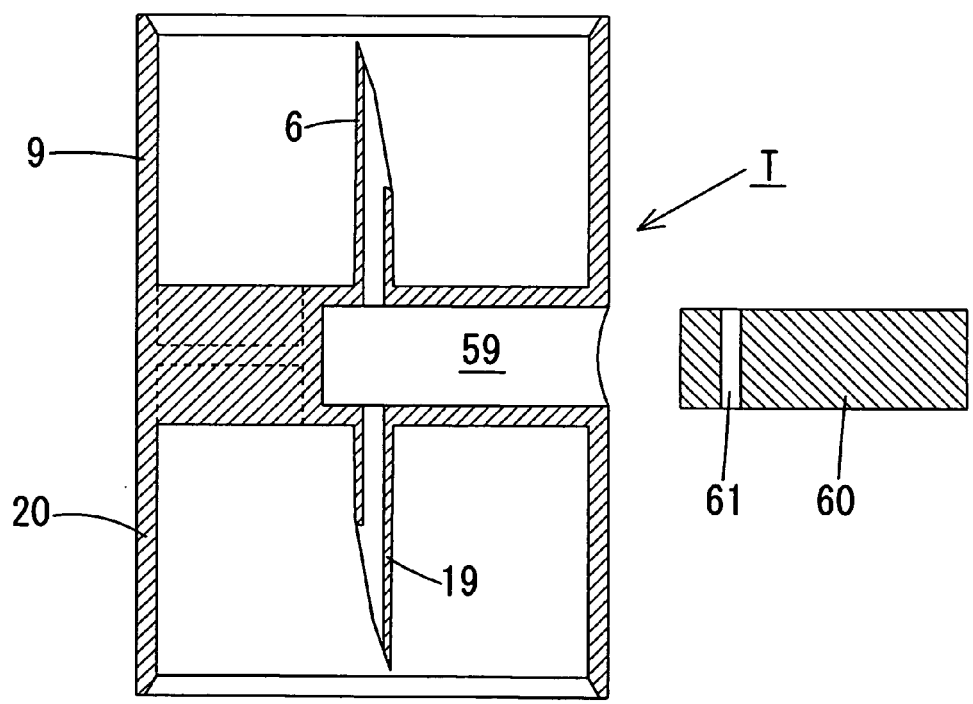

FIG. 29 and FIG. 30 show a sixth embodiment of the present invention, and is a modification of the first embodiment, in which the liquid-specific hollow needle 6 is so called "cut needle" type. The transfer needle T is formed with a laterally extending insertion hole 59 opening toward the side approximately at the vertical center thereof, and an insertion body 60 formed of flexible material such as elastomer is inserted and fixed therein. The insertion body 60 is formed with a communication channel 61 for communicating the liquid-specific hollow needle 6 and the medicament-specific hollow needle 19. Although a method of molding according to the sixth embodiment is similar to a method of molding a transfer needle in the related art, since a slide metal mold for forming the insertion hole 59 opening toward the side has a structure in which both ends of the insertion portion for molding the liquid-specific hollow needle 6 and the medicament-specific hollow needle 19 are supported, molding can be performed easily (there is little risk of breakage of an upper and a lower metal molds, or of defective communication due to generation of flash). Molding, insertion, and fixation of the insertion body 60 are also easy, so that the transfer needle can be provided easily at low costs.

Figure 31:
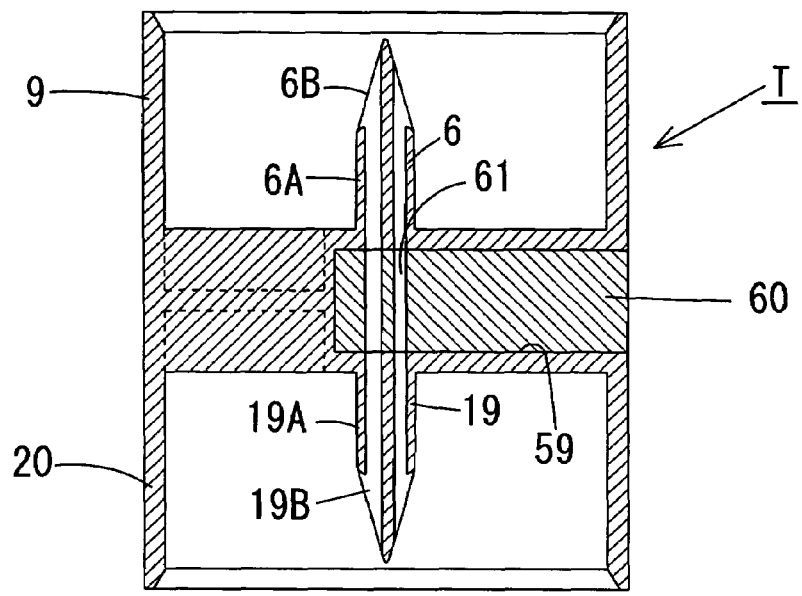
FIG. 31 and FIG. 32 show a seventh embodiment of the present invention.
Figure 32:
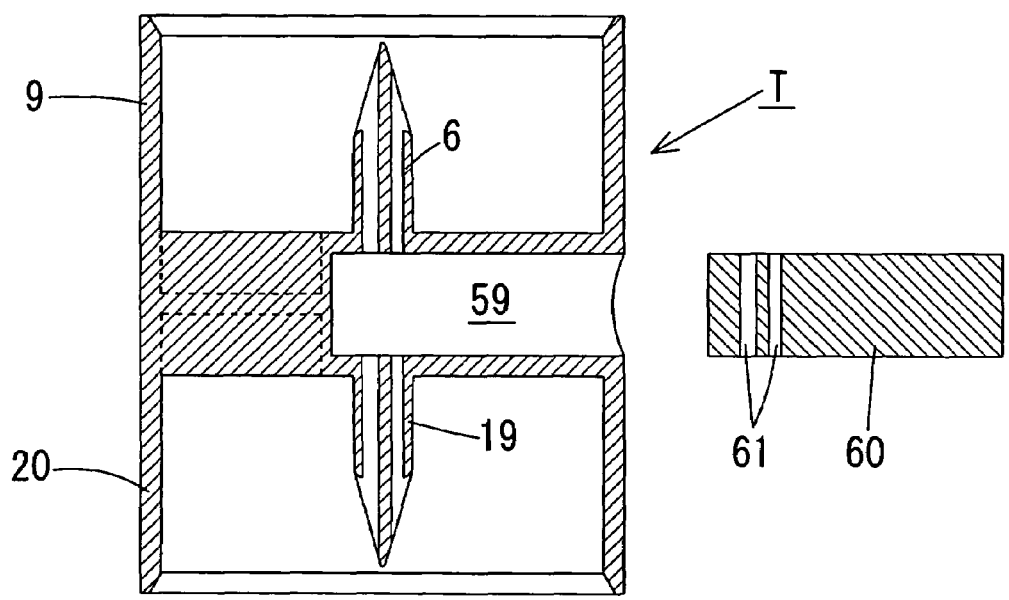

FIG. 31 and FIG. 32 show a seventh embodiment of the present invention, which is a modification of the sixth embodiment, in which the liquid-specific hollow needle 6 and the medicament-specific hollow needle 19 are so-called of "two-hole needle" type and the holes of the respective hollow needles 6, 19 communicate with each other via a pair of communication channels 61 of the insertion body 60. In the seventh embodiment, since the liquid channel and the air channel are provided in the liquid-specific hollow needle 6 and the medicament-specific hollow needle 19, liquid exchange can be performed aseptically and quickly.

Figure 33:
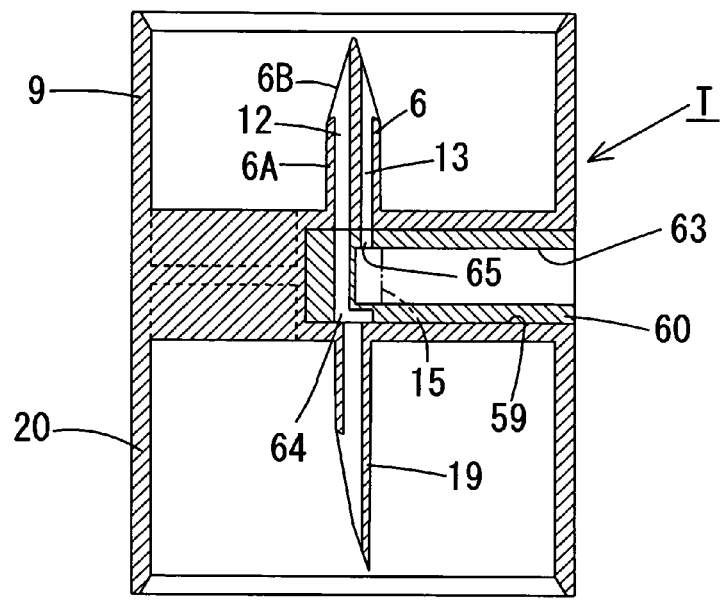
FIG. 33 and FIG. 34 show an eighth embodiment of the present invention.
Figure 34:
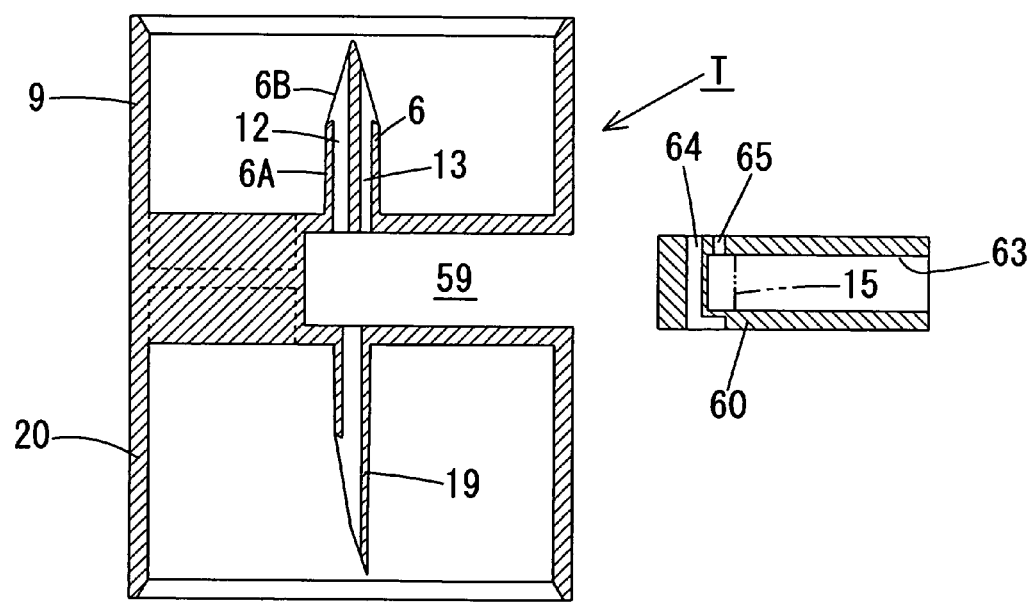

FIG. 33 and FIG. 34 show an eighth embodiment of the present invention, which is a modification of the seventh embodiment, in which the liquid-specific hollow needle 6 is so called "two-hole needle" type and has the liquid channel 12 and the air channel 13. The insertion body 60 is a hollow shape, and is formed therein with a cavity 63 opening toward the outside, and with a liquid communication channel 64 for bringing the liquid channel 12 of the liquid hollow needle 6 into communication with the medicament-specific hollow needle 19, and an air communication channel 65 for bringing the air channel 13 of the liquid-specific hollow needle 6 with the cavity 63. The cavity 63 is provided with the filter 15. The eighth embodiment has the same characteristic as the seventh embodiment.

Figure 35:
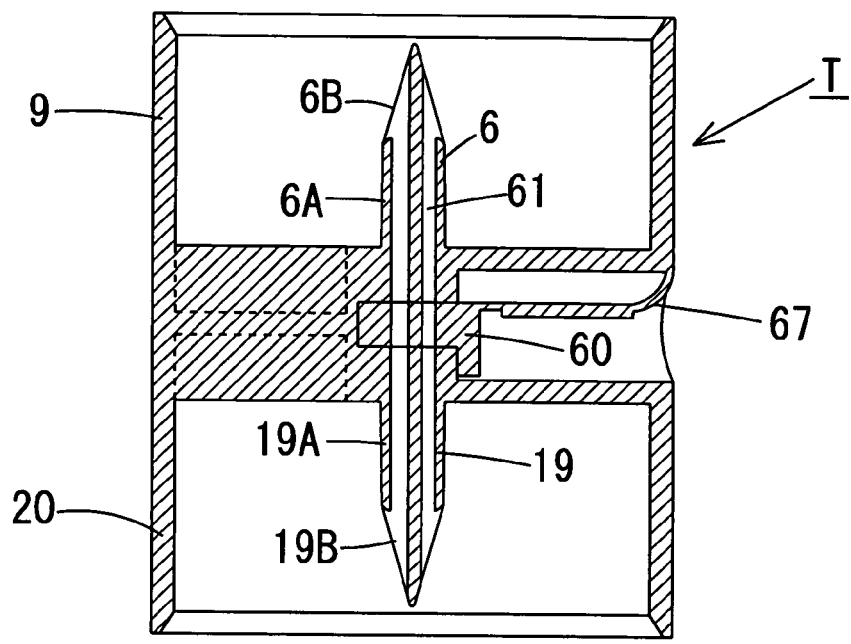
FIG. 35 and FIG. 36 show a ninth embodiment of the present invention.
Figure 36:
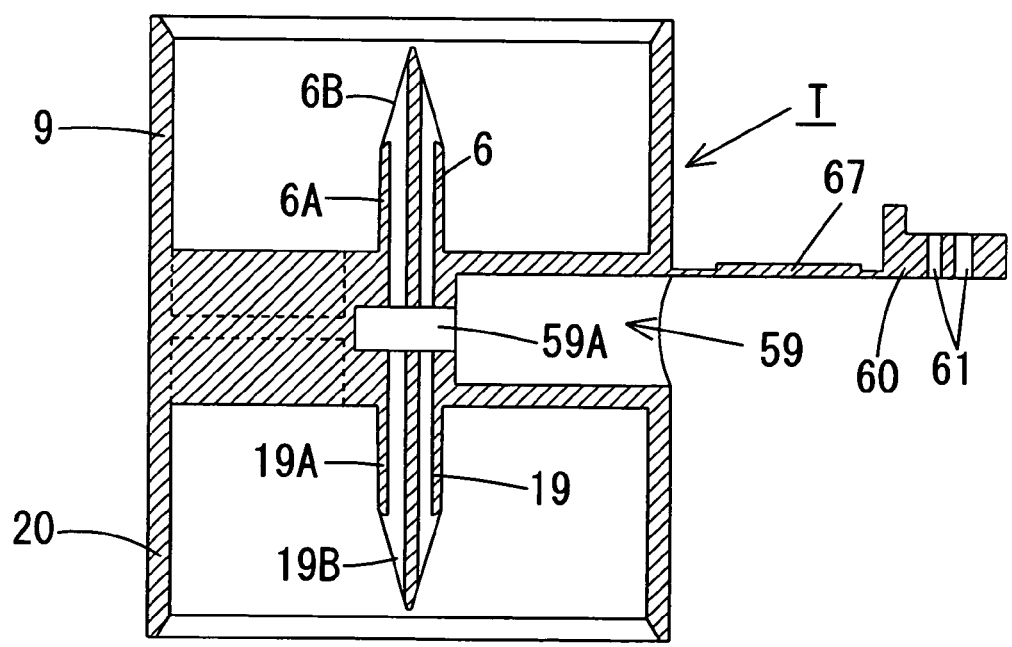
Figure 37A:
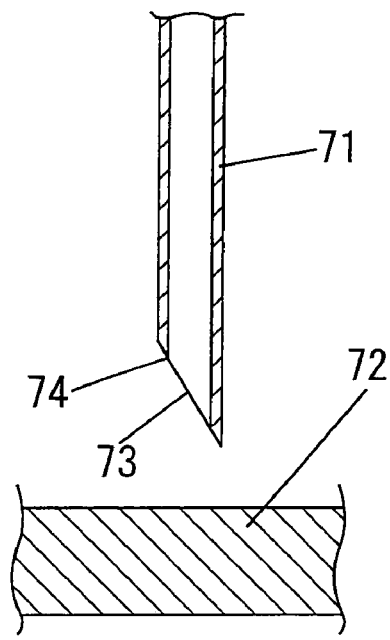
FIG. 37 is a vertical cross-sectional view showing puncture of a transfer needle into a rubber plug in the related art.
Figure 37B:
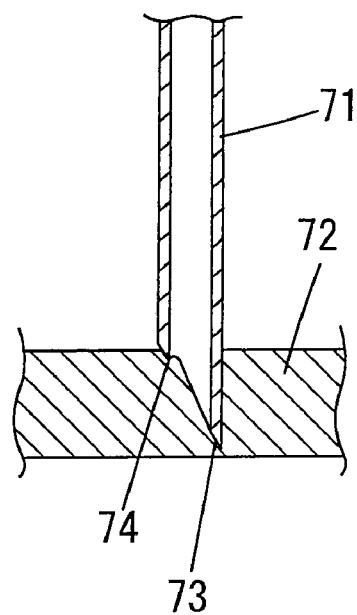
Figure 37C:
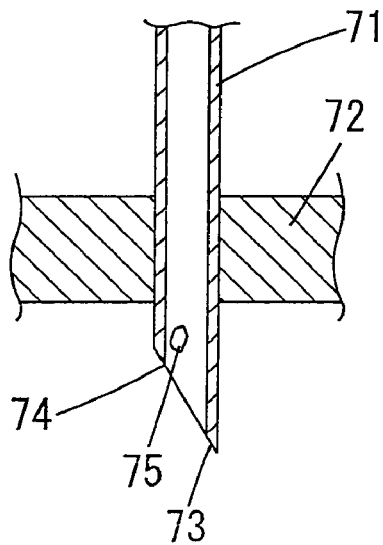
Figure 38:
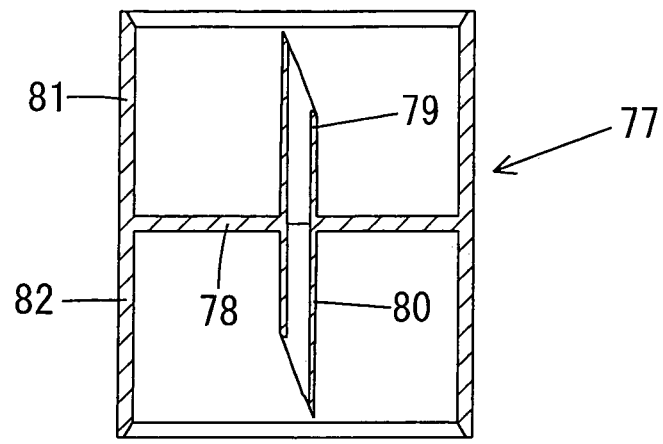
FIG. 38 is a vertical cross sectional view showing a transfer needle in the related art.
Figure 39:
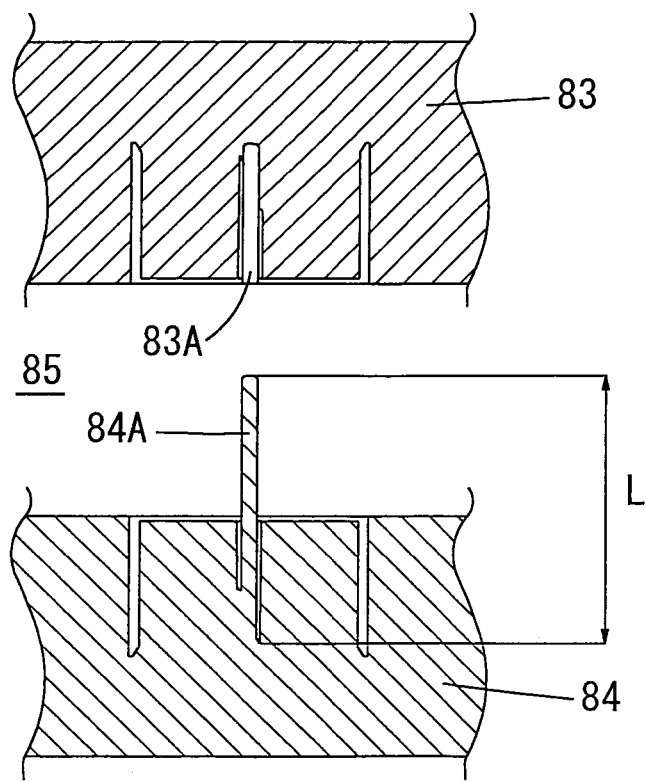
FIG. 39 is an explanatory vertical cross-sectional view showing a molding method of the transfer needle in FIG. 38.
Figure 40:
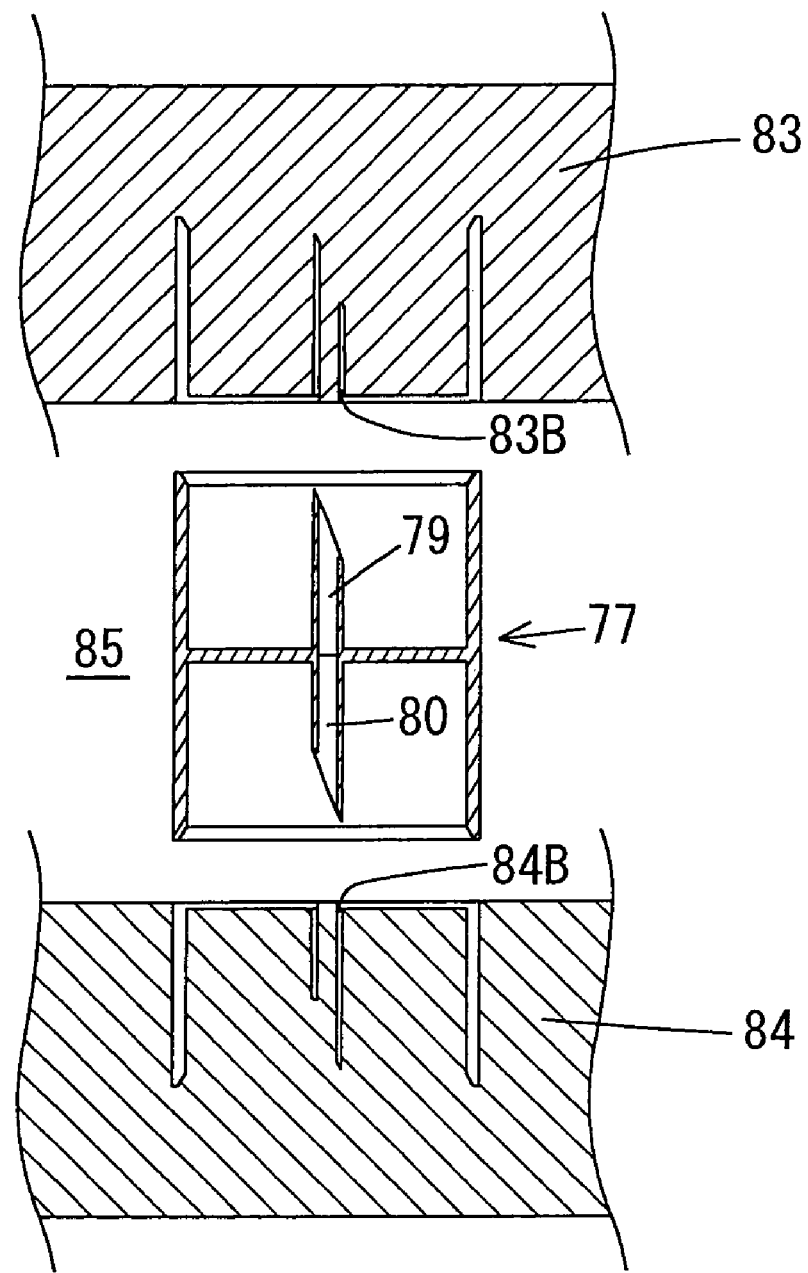
FIG. 40 is an explanatory vertical cross-sectional view showing a molding method of the transfer needle in FIG. 38.
Figure 41A:
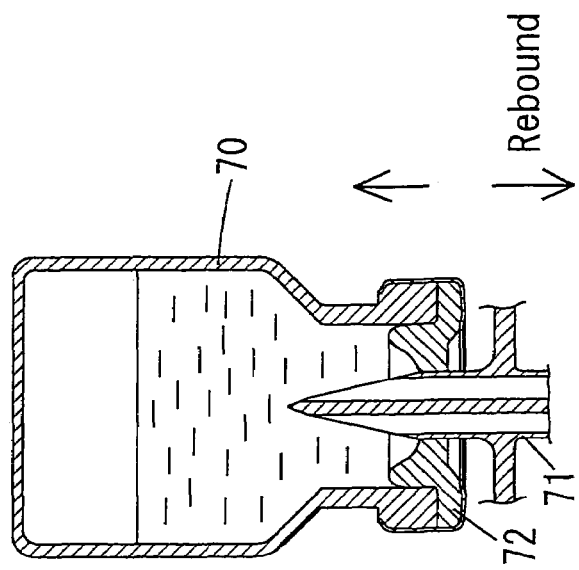
FIG. 41 is an explanatory vertical cross-sectional view showing puncture of a transfer needle into a rubber plug of a vial in the related art.
Figure 41B:
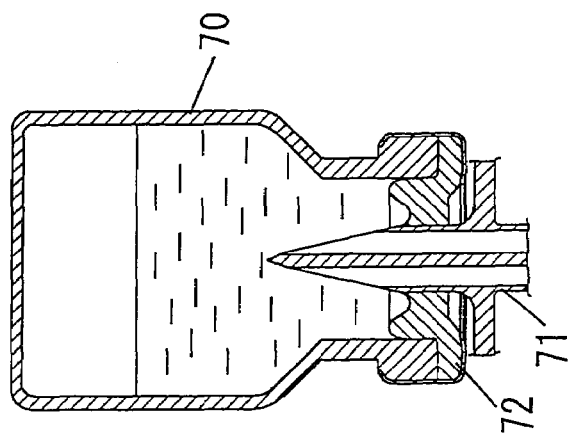
Figure 41C:
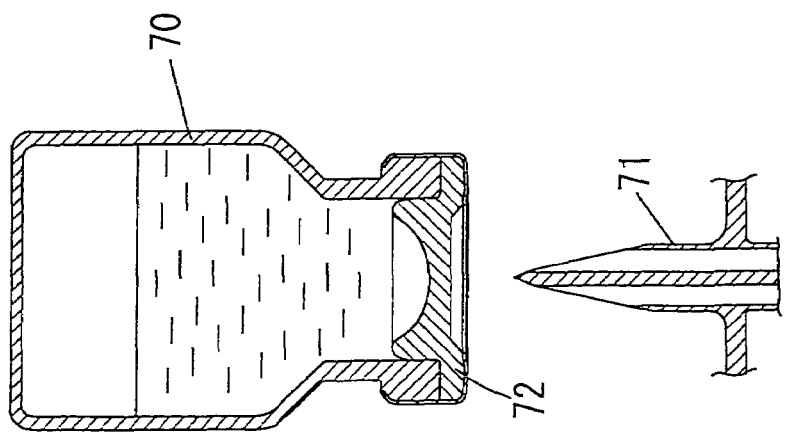

FIG. 35 and FIG. 36 show a ninth embodiment of the present invention, which is a modification of the eighth embodiment, in which the insertion hole 59 has a small-diameter portion 59A positioned between the both hollow needles 6, 19. The insertion body 60 is integrated with the skirt 9 by a hinge 67 having flexibility. By deforming the hinge 67, most part of the insertion body 60 except for a part is inserted into the small-diameter portion 59A of the insertion hole 59. A metal mold for molding the small-diameter portion 59A is a sliding metal mold, and hence generation of flash at the abutting portion between the liquid-specific hollow needle 6 and the medicament-specific hollow needle 19 may be reduced. This is common for the sixth to ninth embodiments. The ninth embodiment has the same characteristic as the eighth embodiment.

What is claimed is:

1. A transfer needle comprising:
   a liquid-specific member; and
   a medicament-specific member to be separably connected or joined to the liquid-specific member in a liquid-tight state,
   the liquid-specific member comprising:
   a liquid-specific hollow needle projecting toward the opposite side from the medicament-specific member,
   the medicament-specific member comprising:
   a medicament-specific hollow needle projecting toward the opposite side from the liquid-specific member and communicating with the liquid-specific hollow needle,
   wherein a female luer is provided on the medicament-specific member at a position opposing to the liquid-specific member,
   the female luer communicating with the hollow needle of said at least one of the liquid-specific member and the medicament-specific member,
   the female luer being separably connected with an injection needle connecting portion of a syringe in a liquid-tight state,
   wherein a filter is provided at the female luer, and said filter prevents residual of medicament, which could not melt, from passing through and removing foreign substance, wherein the liquid-specific member and the medicament-specific member are connected by a hinge, the hinge having flexibility and the hinge being dimensioned and configured to break to allow separation of the liquid-specific member and the medicament-specific member.

2. A transfer needle according to claim 1, wherein the liquid-specific hollow needle and/or the medicament-specific hollow needle comprises;

a cylindrical proximal portion formed with an opening; and a pointed distal portion.

3. A transfer needle according to claim 1, wherein the liquid-specific hollow needle and/or the medicament-specific hollow needle comprises;

a cylindrical proximal portion; and a pointed distal portion formed with an opening.

4. A transfer needle according to claim 1, wherein the liquid-specific member comprises:

a skirt projecting toward the opposite side from the medicament-specific member and enclosing the liquid-specific hollow needle, and wherein the medicament-specific member comprises:

a skirt projecting toward the opposite side from the liquid-member and enclosing the medicament-specific hollow needle.

* * * * *